US005956249A

United States Patent [19]

Beran et al.

[11] Patent Number: 5,956,249

[45] **Date of Patent: *Sep. 21, 1999**

[54] METHOD FOR ELECTROMECHANICAL CONTROL OF THE OPERATIONAL PARAMETERS OF A DOOR IN CONJUNCTION WITH A MECHANICAL DOOR CONTROL MECHANISM

[75] Inventors: Mark A. Beran, Niwot; Davide Andrea, Boulder, both of Colo.

[73] Assignee: Dorma Door Controls Inc., Reamstown, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/807,024

[22] Filed: Feb. 26, 1997

Related U.S. Application Data

[60] Division of application No. 08/475,406, Jun. 7, 1995, which is a continuation-in-part of application No. 08/092,962, Jul. 19, 1993, abandoned.

[51] Int. Cl.[6] .............................. G05B 19/18; H02P 1/00

[52] U.S. Cl. ...................... 364/167.02; 318/261; 318/265

[58] Field of Search .............................. 364/167.01, 400, 364/148; 49/13, 14, 24, 29, 31, 138, 139, 140, 28, 324; 16/49, DIG. 7, DIG. 9, DIG. 16; 318/264, 265, 266, 267, 272, 275, 446, 278, 466, 283, 481, 626; 395/20, 903

[56] References Cited

U.S. PATENT DOCUMENTS

| | | | |
|---|---|---|---|
| 1,684,704 | 9/1928 | Hubbell | 49/32 |
| 2,256,613 | 9/1941 | Forman et al. | 49/32 |
| 3,127,160 | 3/1964 | Wallmann | 49/32 |
| 3,129,936 | 4/1964 | Carlson | 49/32 |
| 3,874,117 | 4/1975 | Boehm | 49/264 |
| 4,040,144 | 8/1977 | Lasier et al. | 16/66 |
| 4,220,051 | 9/1980 | Catlett | 74/89 |
| 4,222,147 | 9/1980 | Burnett, Jr. | 16/62 |
| 4,339,842 | 7/1982 | Fontana et al. | 16/32 |
| 4,348,835 | 9/1982 | Jones et al. | 49/139 |
| 4,429,490 | 2/1984 | Zunkel | 49/32 |
| 4,498,033 | 2/1985 | Aihara et al. | 318/466 X |
| 4,727,679 | 3/1988 | Kornbrekke et al. | 49/138 |
| 4,793,023 | 12/1988 | Simpson et al. | 16/58 |
| 4,831,509 | 5/1989 | Jones et al. | 364/167.01 |
| 4,918,864 | 4/1990 | Lunenschloss et al. | 49/137 |
| 4,952,080 | 8/1990 | Boiucaner et al. | 388/811 |
| 4,995,194 | 2/1991 | Schultze et al. | 49/32 |
| 5,162,711 | 11/1992 | Heckler | 318/264 |
| 5,278,480 | 1/1994 | Murray | 318/626 |

FOREIGN PATENT DOCUMENTS

| | | |
|---|---|---|
| 0632181 | 1/1995 | European Pat. Off. . |
| 3730114 | 5/1988 | Germany . |
| 4124282 | 1/1993 | Germany . |
| 4323150 | 1/1995 | Germany . |
| 475073 | 11/1937 | United Kingdom . |
| 8911578 | 11/1989 | WIPO . |

*Primary Examiner*—William Grant
*Assistant Examiner*—Carolyn T. Baumgardner
*Attorney, Agent, or Firm*—Reed Smith Shaw & McClay LLP

[57] ABSTRACT

A method is disclosed for selective alteration and control of door movement modes utilizing an apparatus that is primarily non-hydraulic and incorporated with a known mechanism which is functional independently from the apparatus in one mode of operation and which includes a piston for controlling door closing characteristics by selected fluid flow within the mechanism. The apparatus includes a motor driven lead screw having a linearly movable shuttle unit mounted thereon, the shuttle unit being positioned relative to the piston of the mechanism to accommodate nonattached contact with the piston to urge the piston, when the shuttle unit is moved, in a direction that will at least provide selective assistance with door opening in another mode of operation. Operation of the apparatus is controlled by programming of a related controller including non-volatile memory.

8 Claims, 22 Drawing Sheets

*Fig. 7*
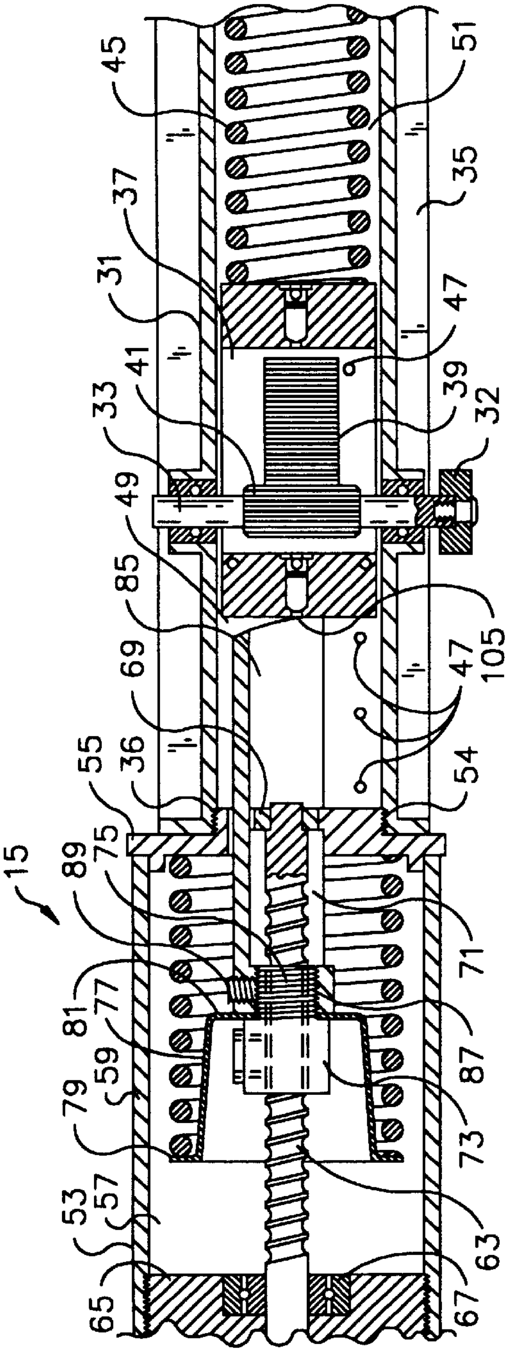
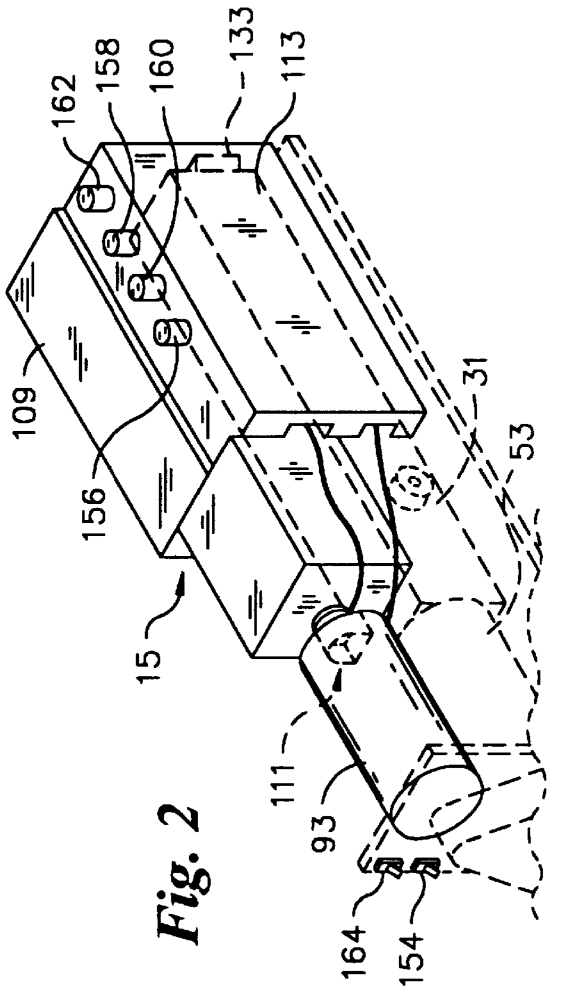
*Fig. 2*

*Fig. 11*
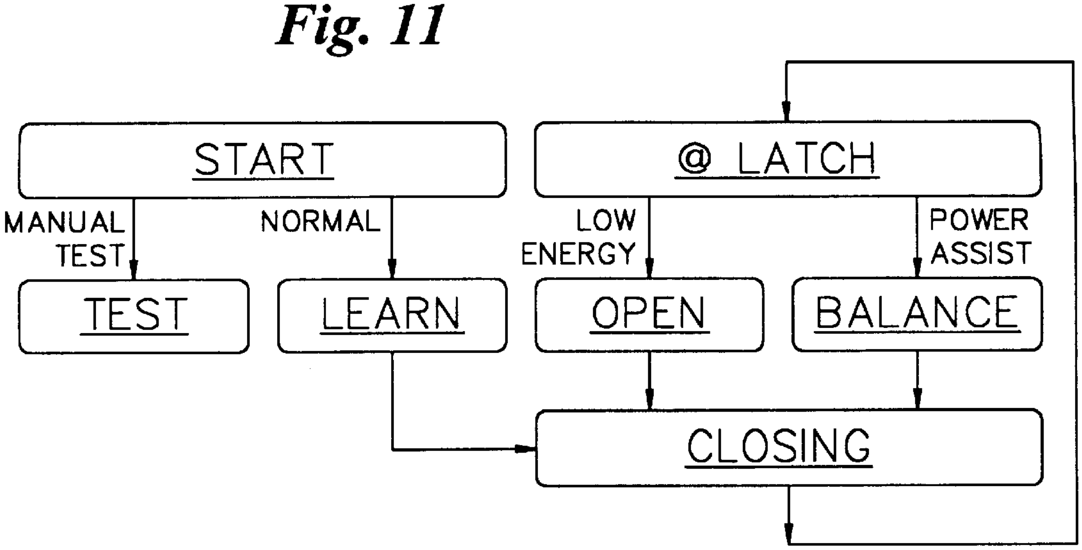
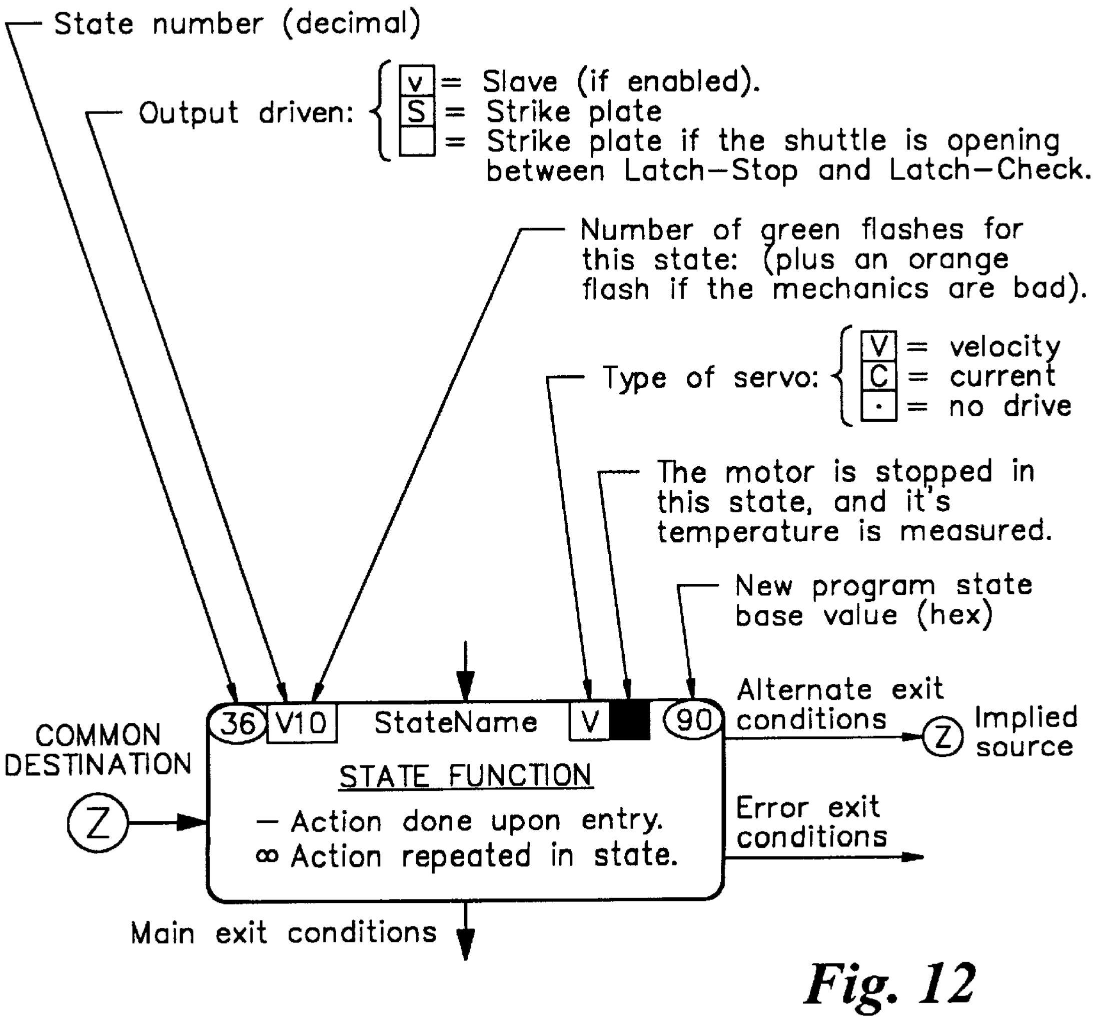
*Fig. 12*

METHOD FOR ELECTROMECHANICAL CONTROL OF THE OPERATIONAL PARAMETERS OF A DOOR IN CONJUNCTION WITH A MECHANICAL DOOR CONTROL MECHANISM

RELATED APPLICATION

This application is a divisional of pending U.S. patent application Ser. No. 08/475,406 filed Jun. 7, 1995, which is a continuation-in-part of abandoned U.S. patent application Ser. No. 08/092,962 filed Jul. 19, 1993, now abandoned.

FIELD OF THE INVENTION

This invention relates to apparatus and methods for controlling the operation of doors, and, more particularly, relates to door opening and closing apparatus and methods.

BACKGROUND OF THE INVENTION

Hydraulic and/or pneumatic door closers for controlling closing characteristics of swing doors are well known and have been in wide use (see, for example, U.S. Pat. Nos. 4,793,023, 4,414,703 and 4,378,612). Primarily hydraulically or pneumatically operated openers and/or opening assist mechanisms are also known (see U.S. Pat. Nos. 3,948,000, 3,936,977, 4,995,194 and 4,429,490). Similarly, a variety of electromechanical automatic door operators have been heretofore known and/or utilized (see U.S. Pat. Nos. 2,910,290, 3,127,160, 4,045,914 and 4,220,051). Each (hydraulic and/or pneumatic and electromechanical operators) has its own unique advantages and disadvantages.

There has also been some attempt at combining these approaches so that at least some of the advantages of each are utilized (see, for example, U.S. Pat. Nos. 3,874,117, 3,129,936,1,684,704, 2,256,613, and 4,438,835). Such approaches to door controllers have for the most part sought to utilize the hydraulic mechanism merely as a speed control (i.e., not as an independently functioning unit), and/or have utilized each type of operator in parallel connection with the door rather than in conjunction. Such approaches are not entirely satisfactory due to lack of attractiveness arid additional space requirements adjacent to the door, expense of manufacture and/or operation (for example, where a clutch or other disengagement mechanism is required for operation, or where a motor is in constant operation for causing both opening and active door closing, and/or undue control complexity required to achieve reliability and to meet door operating standards.

In view of recent concern and legislation regarding provision of access for the disabled to various public and private buildings, it would be desirable to provide a low cost, low power and reliable apparatus for use with a standard, typically hydraulically dampening, door closer arrangement to provide a door operator which meets the accessibility requirements of the disabled while preserving the functionality and meeting compliance requirements of the standard door closer.

Typical compliance requirements, such as those established in the A.N.S.I. guidelines, include minimum efficiency standards for door closers. In U.S. Pat. No. 4,995,194, wherein a hydraulic pump is utilized to move fluid, and thus a piston, to assist with door opening, door closing efficiency is maintained by using the same hydraulic flow path or paths for closing as has been traditionally used by such door closers. In this manner (utilizing no additional components directly connected to the existing piston) no additional drag is placed on the system and thus the efficiency is unchanged. In order to meet efficiency requirements while using an electromechanical drive to open the door, either carefully controlled motor driven opening and closing or various clutching mechanisms for decoupling an electromechanical drive during the closing cycle (particularly necessary in the event of an interruption of power supply) have generally been required.

Improvement of door operators directed to maintaining and/or enhancing the utility and efficiency of traditionally utilized hydraulic or pneumatic door closers, while selectively providing low power yet fully automatic door opening and/or opening assistance, without undue complication and expense, could thus be utilized.

SUMMARY OF THE INVENTION

This invention provides a method for selective alteration of the operating parameters of a swing door utilizing a non-hydraulic control apparatus combined with, or incorporating, a known type of mechanism connectable with a door and including a piston for controlling door closing characteristics by selected fluid flow within the mechanism. The apparatus is configured for maintaining and/or enhancing the utility and efficiency of the closing control mechanism without undue complication, while selectively providing low power yet fully automatic door opening and/or opening assistance, and is simple to install (i.e., can be mounted for left or right mounted doors on either the push or pull side of the door without need for special parts or modifications) and operate.

The apparatus selectively operates under program control in plural modes and can thus be utilized to provide entranceway accessibility to handicapped or disabled persons in compliance with requirements of various legislation, while at the same time allowing a wide range of user adjustable door closing forces. The power opening assist mode of the apparatus (selected, for example, by user activation of a push plate or the like) reduces required opening force applied by a user to between 0.5 to 5 lbs. Both the power assist mode and the automatic opening mode of operation of the apparatus meets A.N.S.I. guidelines (A 156.19—1990) for low energy automatic and power assist door operators.

In the normal mode of operation the apparatus functions as a typical manual door closer (i.e., user push open with hydraulic/spring closing characteristics, for example, under the control of the closer mechanism), meeting the requirements of a grade 1 door closer as delineated in A.N.S.I. guidelines (A156.4—1991).

The apparatus is primarily non-hydraulic and selectively directly manipulates the piston of the mechanism. A movable element is positioned to accommodate nonattached contact with the piston of the mechanism for urging the piston in one direction when the element is moved by a selectively operable actuator. The piston of the mechanism remains normally movable in the one direction by a user opening the door in a first door operating mode and is selectively urged in the one direction by movement of the element to at least provide selective assistance with door opening in a second door operating mode.

The method for selectively altering operational parameters of a door in conjunction with the mechanism includes the steps of positioning a unit to accommodate nonattached contact with the piston of the mechanism and selectively moving the unit to urge the piston in a direction that will at least assist with door opening.

First and second modes of door operation may be selected. Movement of the unit is electromechanically caused to automatically open the door when the first mode of operation has been selected, and to exert force on the piston to assist a user of the door in opening the door by reducing force necessary to open the door when the second mode of operation has been selected. Normal functioning of the mechanism when neither of the modes of operation is functional is accommodated.

Operational variables of a particular door installation are learned by causing the unit to contact and move the piston and thus the door. Learned operational variables are stored in memory and are updated during operation of the door.

Door closing is monitored and, as necessary, controlled within preset parameters by causing the unit to at least periodically contact the piston during door closing. The unit may be caused to contact and move the piston and thus the door a preselected distance when a user is detected approaching the door to thus prompt the user.

It is therefore an object of this invention to provide an improved swing door operating method.

It is another object of this invention to provide an improved method for selective alteration of the operating parameters of a swing door.

It is still another object of this invention to provide an improved method for swing door operation that is utilized with, or incorporates, a known type of mechanism connectable with a door and which includes a piston for controlling door closing characteristics by selected fluid flow within the mechanism.

It is still another object of this invention to provide a door control method that maintains and/or enhances the utility and efficiency of known types of door closing control mechanisms, while, without undue complication, selectively providing low power yet fully automatic door opening and/or opening assistance.

It is yet another object of this invention to provide a door operations control method that can be used for doors employed at entranceways accessible to handicapped or disabled persons in compliance with requirements of various legislation, that has a selectively actuated power assist mode of operation which reduces the required opening force to from 0.5 to 5 lbs., that has a selectively actuated automatic opening mode meeting A.N.S.I. guidelines for low energy automatic and power assist door operators, and that in a normal mode of operation functions as a typical manual door closer meeting the requirements of a grade 1 door closer as delineated in A.N.S.I. guidelines.

It is still another object of this invention to provide a method for selectively altering operational parameters of a door in conjunction with normal operation of a mechanism connectable with the door and including a piston for controlling door closing characteristics by selected fluid flow within the mechanism, the method including the steps of positioning a unit to accommodate nonattached contact with the piston of the mechanism and selectively moving the unit to urge the piston in a direction that will at least assist with door opening.

It is still another object of this invention to provide a method for for selectively altering operational parameters of a door in conjunction with normal operation of a mechanism connectable with the door and including a piston for controlling door closing characteristics by selected fluid flow within the mechanism, the method including selecting between first and second modes of door operation, electromechanically causing movement of the piston to automatically open the door when the first mode of operation has been selected, electromechanically exerting force on the piston to assist a user of the door in opening the door by reducing force necessary to open the door when the second mode of operation has been selected, and accommodating normal functioning of the mechanism when neither of the modes of operation is functional.

It is yet another object of this invention to provide a method for selectively altering operational parameters of a door in conjunction with normal operation of a mechanism connectable with the door and including a piston for controlling door closing characteristics by selected fluid flow within the mechanism, the method including learning operational variables of a particular door installation by causing a unit to contact and move the piston and thus the door, and storing the learned operational variables in memory.

It is yet another object of this invention to provide a method for for selectively altering operational parameters of a door in conjunction with normal operation of a mechanism connectable with the door and including a piston for controlling door closing characteristics by selected fluid flow within the mechanism, the method including bringing a unit into contact with the piston, controlling door opening characteristics within preset parameters by causing the unit to exert selected force on the piston, and one of monitoring door closing and controlling door closing characteristics within preset parameters by causing the unit to at least periodically contact the piston during door closing.

It is yet another object of this invention to provide a method for selectively altering operational parameters of a door in conjunction with normal operation of a mechanism connectable with the door and including a piston for controlling door closing characteristics by selected fluid flow within the mechanism, the method including causing a unit to contact and move the piston and thus the door a preselected distance when a user is detected approaching the door to thus prompt the user, and causing the unit to exert force on the piston to assist the user of the door in opening the door by reducing force necessary to open the door.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 2 is a partial perspective view of the apparatus of this invention;

FIG. 7 is a sectional view illustrating the apparatus' position after initiation of assistance with door opening;

FIGS. 11 through 19 are charts illustrating a second embodiment of operational control of the apparatus of this invention.

DESCRIPTION OF THE INVENTION

Figure 1:
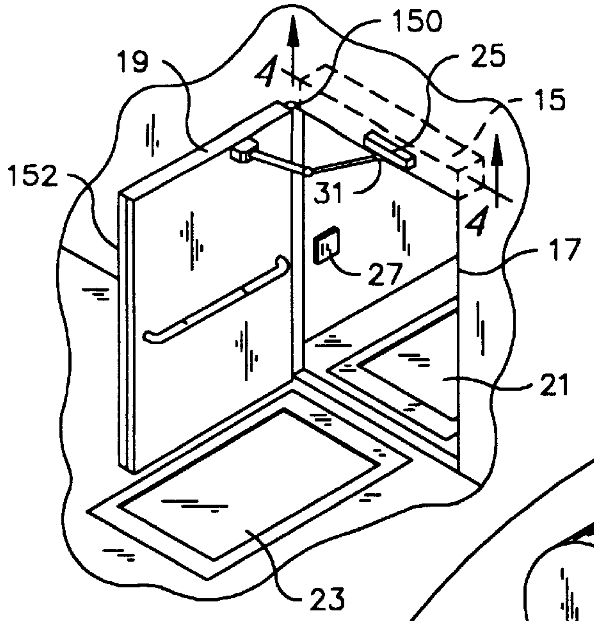
FIG. 1 is a perspective view of the apparatus of this invention in position in a doorway.
Figure 3:
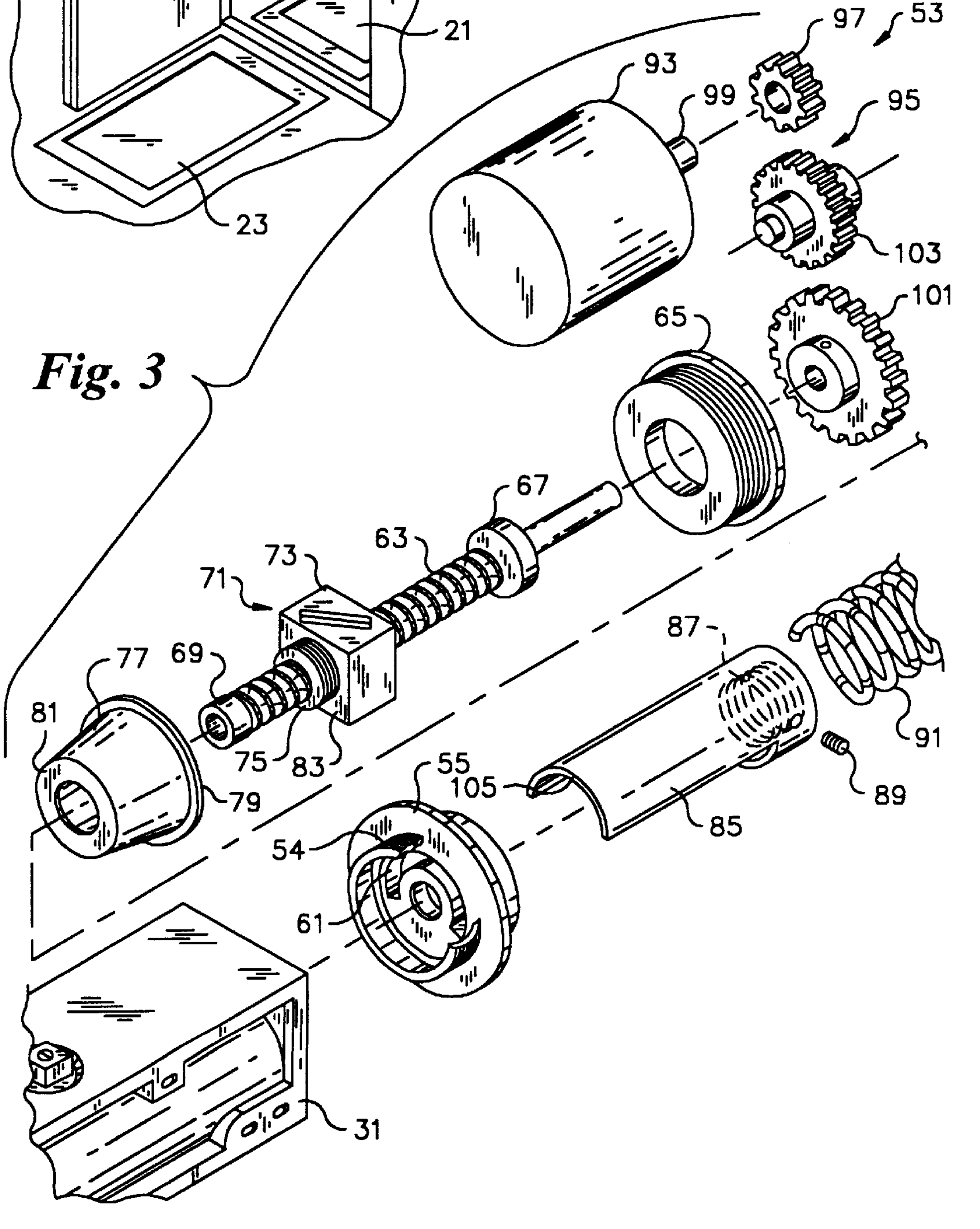
FIG. 3 is a partial exploded view of the apparatus of this invention.
Figure 4:
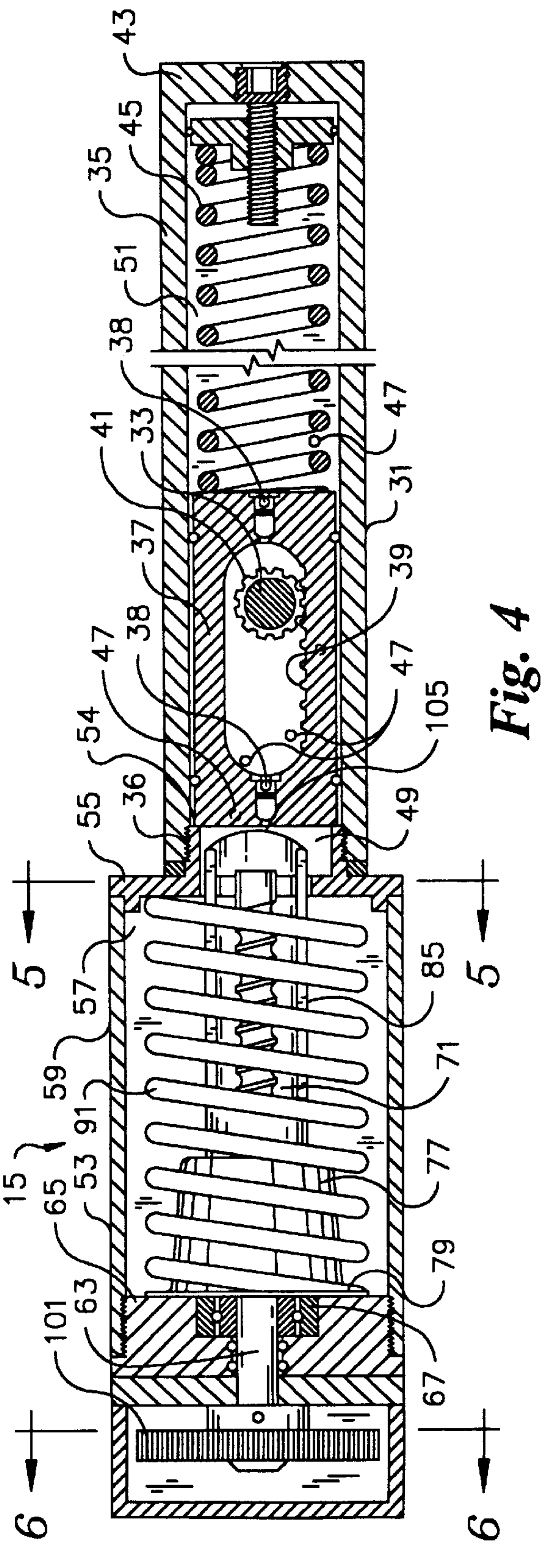
FIG. 4 is a partial sectional view taken through section lines 4—4 of FIG. 1.
Figure 5:
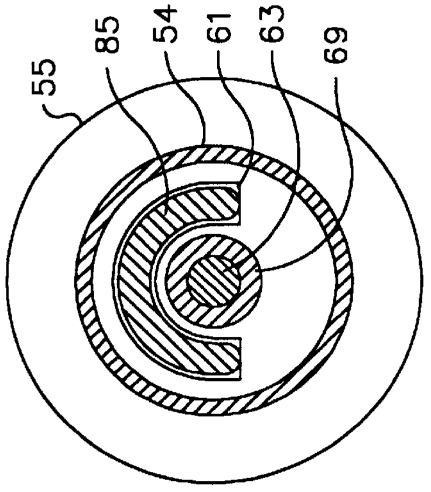
FIG. 5 is a sectional view taken through section lines 5—5 of FIG. 4.

FIG. 1 shows apparatus 15 of this invention mounted in doorway 17 adjacent to door 19. For purposes of illustration only, various movement sensors and actuators are illustrated, such as pressure pads 21 and 23, infrared (IR) or radio frequency (RF) sensor 25, and push plate 27, which may be utilized for actuation of apparatus 15 as discussed hereinbelow.

As also shown in FIGS. 2 through 4 and 7, apparatus 15 includes, or is retrofittable with, standard door closing speed control mechanism 31 including, in the case illustrated in FIG. 2 for a push side mounting (i.e., push open) of the mechanism to the door, a two-piece relatively pivotable control arm 32 pivotably connected at shaft 33 at one end and at door 19 at the other end. Apparatus 15 is adaptable as well to pull open type doors having a control arm connected with mechanism 31 at one end and at the other end to a slide track mounted on the door face, as is well known to those skilled in the art.

While devices such as mechanism 31 are well known to those skilled in the art (see, for example, U.S. Pat. No. 4,793,023, for a variation on the commonly known speed control mechanism), mechanism 31 typically will include cylinder 35 (most often with a threaded access passage 36 at one or both ends for maintenance, repair and the like) having shaft 33 rotatably journalled therethrough and piston 37 (having check valves 38 therein to allow free passage of fluid therethrough during the opening cycle of door 19) mounted for reciprocal movement in cylinder 35. Piston 37 has shaft 33 passing therethrough and rack 39 defined at one interior side thereof. Pinion gear 41 is mounted on shaft 33 so that, when door 19 is opened, shaft 33 and thus pinion gear 41 are rotated thereby moving piston 37 toward end 43 by their engagement with rack 39. In this manner, return spring 45 is loaded, closing characteristics of the door (for example, sweep and latch) thus being controlled by a combination of the unloading of spring 45 and controlled passage of oil in cylinder 35 through the various fluid passageways 47 between variable volume compartments 49 and 51.

Apparatus 15 includes substantially non-hydraulic, electromechanical operator unit 53 engageable with mechanism 31 at threaded end portion 54 of housing end plate 55 in opening 36 of mechanism 31 thus allowing operational communication between chamber 57 of housing 59 and compartment 49 of mechanism 31 through opening 61 in end plate 55 (see FIGS. 2 through 5). Unit 53 includes lead screw 63 rotatably supported in end plates 65 and 55 by bearings 67 and 69, respectively, (see FIG. 7). Shuttle assembly 71 is mounted on screw 63 and is linearly movable therealong.

Shuttle assembly 71 includes lead screw nut 73 (for example, a ball nut assembly) which has a threaded male projection 75 at one side thereof. Spring retainer cup 77 having retaining lips 79 and 81 is mounted over screw 63 with lip 81 abutting surface 83 of nut 73. Shuttle 85 having threaded opening 87 is threaded onto projection 75 of nut 73, and is held in place thereon by set screw 89. Return spring 91 is mounted between end plate 55 and lip 79 of retainer cup 77, and is thus loaded when shuttle assembly 71 is moved toward and through end plate 55 upon rotation of screw 63 (return spring 91 serving primarily to return shuttle assembly 71 to its home position adjacent end plate 65 under both normal conditions and in case of power outage or the like).

Figure 6:
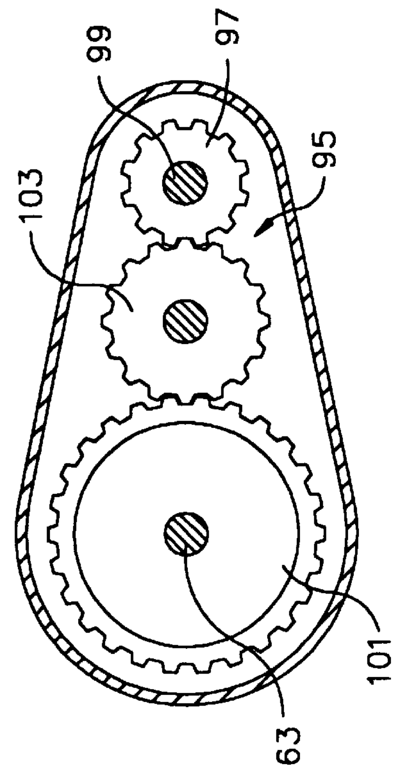
FIG. 6 is a sectional view taken through section lines 6—6 of FIG. 4.
Figure 8A:
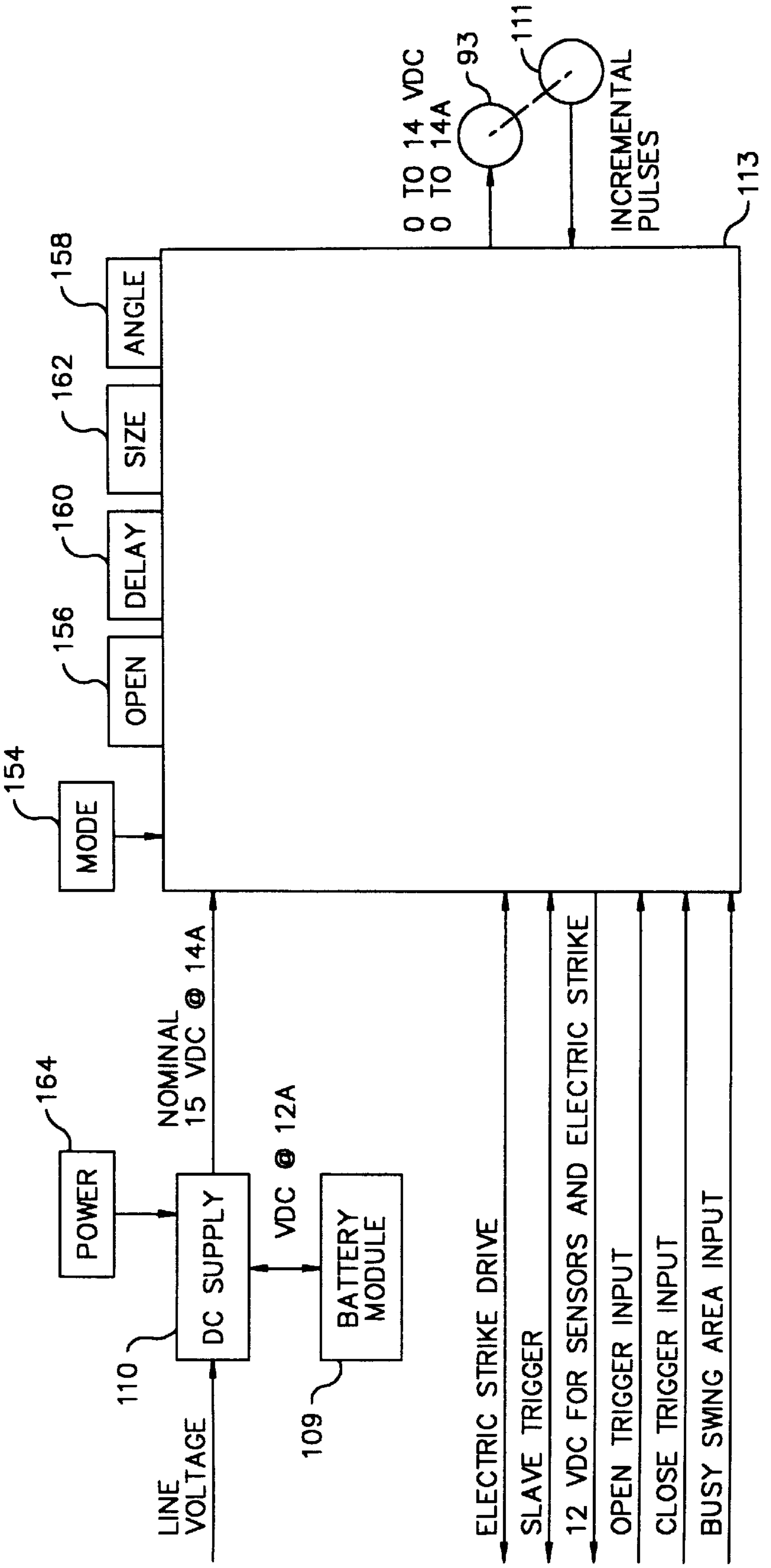
FIG. 8A is a block diagram of the operational controls of the apparatus of this invention.
Figure 8B:
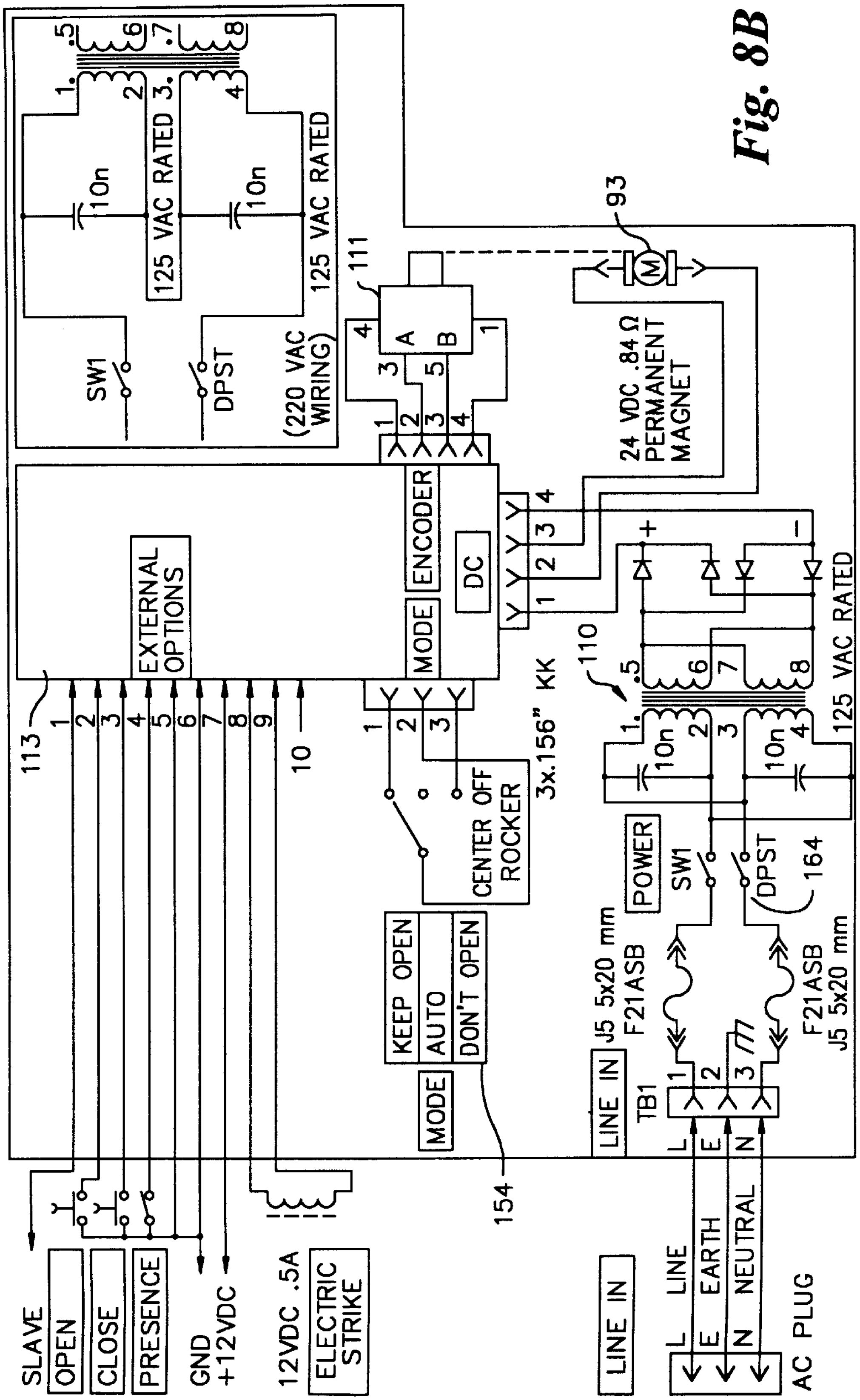
FIG. 8B is a schematic of the operational control circuitry of the apparatus o his invention.
Figure 9A:
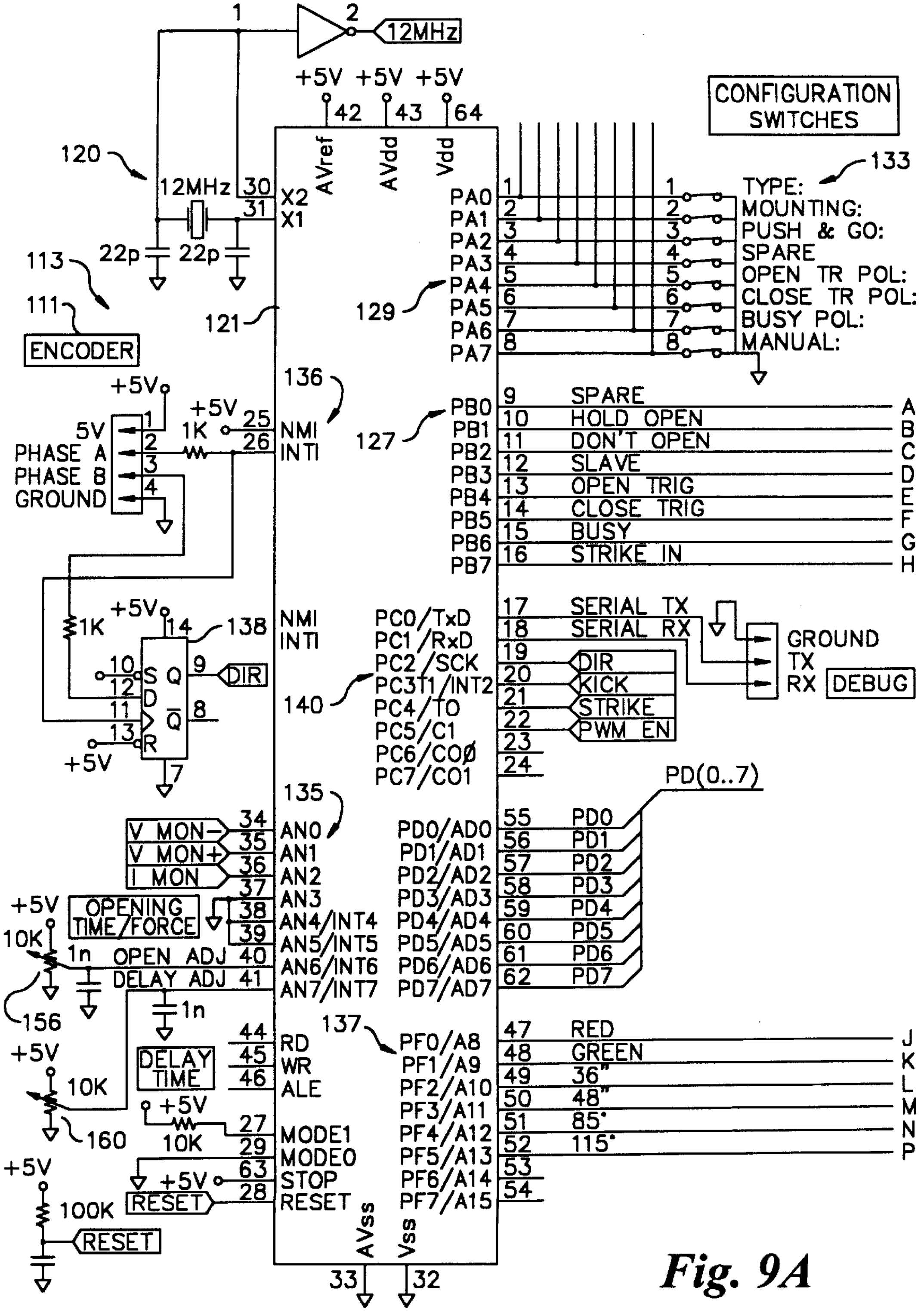
FIG. 9A through 9C are schematics of the controller of the apparatus.
Figure 9B:
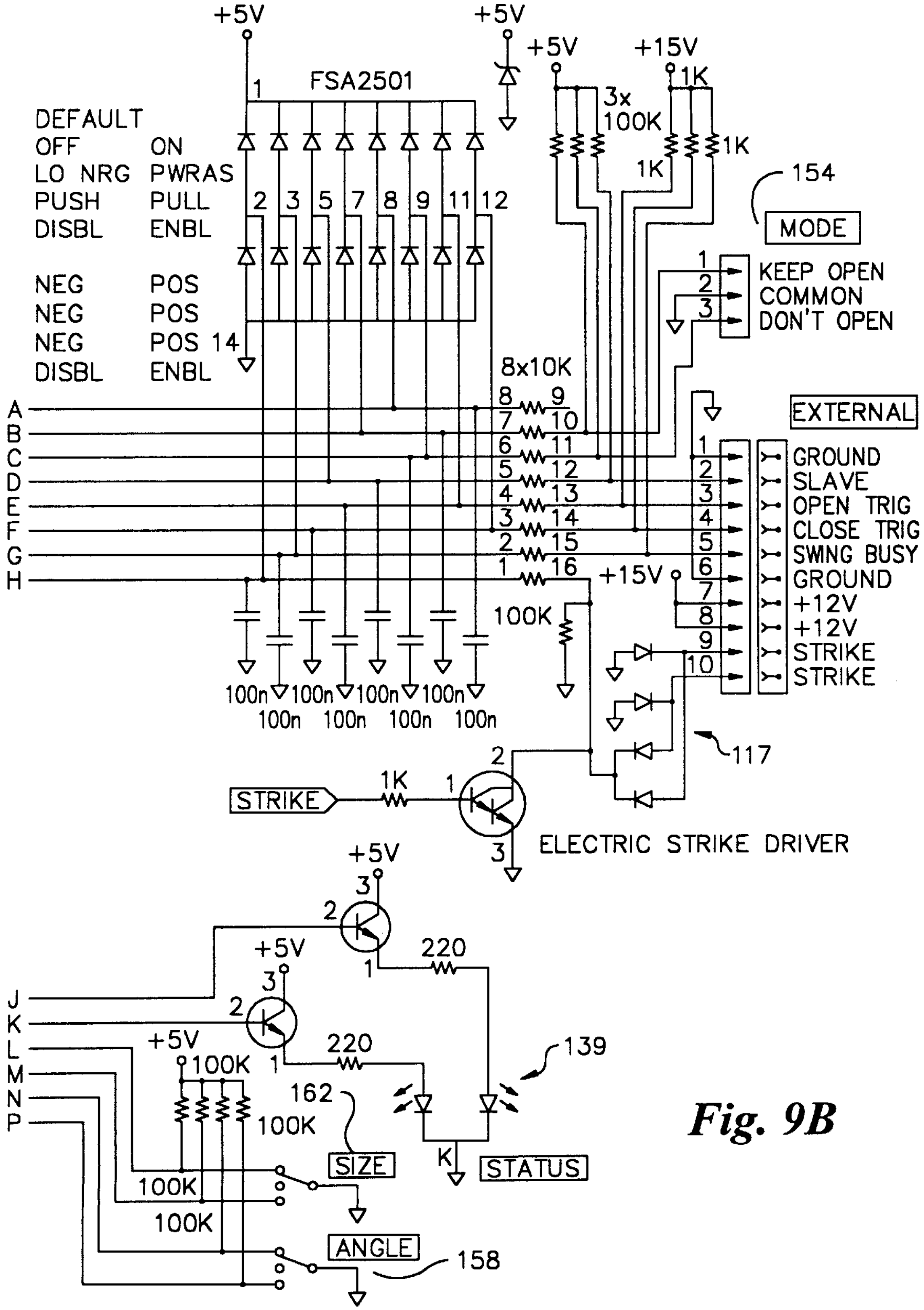
Figure 9C:
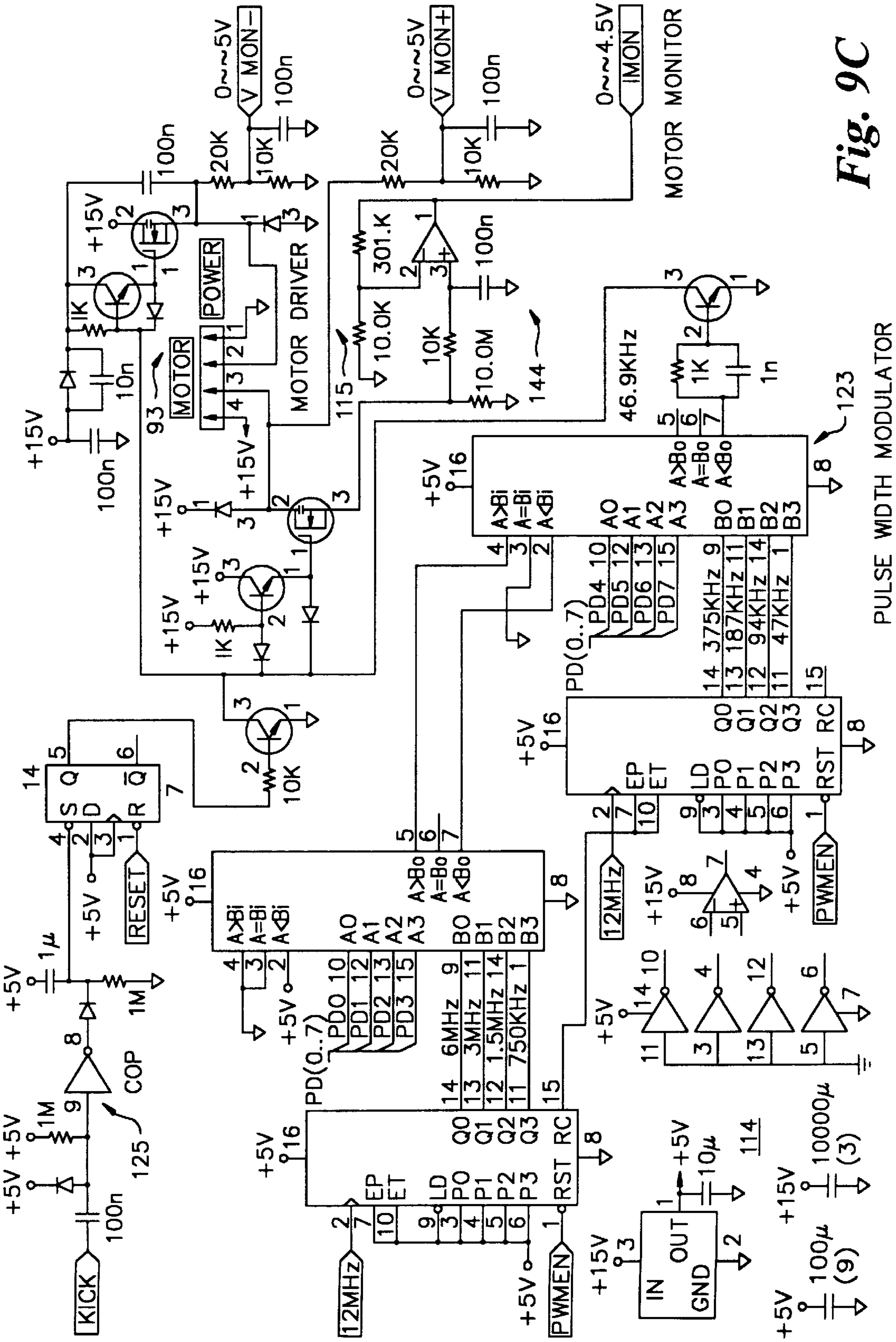

Drive motor 93 is mounted adjacent to unit 53 and drives lead screw 63 through gear train assembly 95 (though a belt and pulley or chain and sprocket arrangement could also utilized). As seen in FIGS. 2 and 6, assembly 95 includes drive gear 97 connected with motor output shaft 99, main drive gear 101 having screw 63 connected thereto, and idler gear 103. Any suitable gear ratio to the selected task may be utilized.

Chamber 57 housing shuttle assembly 71 also serves as a hydraulic fluid reservoir to effectively equalize normal hydraulic operation of mechanism 31 (rather than serving any operational function, other than lubrication, in unit 53). Housing 59 is thus sealed utilizing appropriate means to avoid fluid leakage.

Shuttle 85 and opening 61 are configured (in a semicircular cross-section) so that rotation of shuttle assembly 71 is prohibited during operation of the apparatus and to prevent blockage of fluid flow through piston 37 when shuttle 85 is in contact therewith.

Under selective control as discussed hereinbelow, end 105 of shuttle 85 is brought into contact with piston 37 of mechanism 31, but is not rigidly attached to it. When screw 63 is rotated, the shuttle will deliver a desired force against piston 37 (ranging from a user assisting force, effectively reducing, but not eliminating the user force required to open the door, to sufficient force to automatically open the door). Upon completion of the opening cycle, shuttle assembly 71 is returned by spring 91, though embodiment of the apparatus could be conceived whereby assembly 71 is moved away from piston 37 by rotation of screw 63 by motor 93 (and only in the case of a power down, by the unloading of spring 91). Mechanism 31 thus functions in its traditional mode to control door closing.

As will be discussed hereinbelow, the return characteristics of piston 37 are monitored by apparatus 15 to assure proper return characteristics, operation of motor 93 under the operational controls of the apparatus during closing allowing braking of the piston if predetermined desired return speed parameters are exceeded (for example, if the guidelines of A.N.S.I. A 156.19 are exceeded) or if an obstacle is sensed in the doorway.

Apparatus 15 can be used for entranceways accessible to handicapped or disabled persons according to the requirements of the Americans with Disabilities Act, and includes a power assist override mode in which the adjustable opening force is reduced to 0.5 to 5 lb. and an automatic opening mode. Either mode meets A.N.S.I. A 156.19—1990 requirements for low-energy automatic and power assist door operator. The normal mode of operation of apparatus 15 is as a manual door operator (i.e. user push open and hydraulic/spring close) and, in this mode of operation, meets all of the requirements of a grade 1 door closer as delineated in A.N.S.I. A156.4 (1991).

Thus, in the manual mode of operation, apparatus 15 functions exactly like mechanism 31 would function alone (i.e., the presence of unit 53 is transparent to the user). A handicap override, initiated by either a push plate, remote IR or RF link, or by a push and go circuit, activates the selected powered opening mode of operation (which selection is performed at the factory or in the field by the installer).

In the power assist mode, the operation of apparatus 15 results in reduction of the opening force so long as the door is being opened or as long as an optional presence sensor indicates that someone is in the swing area of the door. The door does not self open in this mode of operation. Instead, the disabled person is assisted in opening the door by application of force to piston 37 while yet requiring one to push the door open and pass through the doorway.

If the user applied opening force on the door is released, the door comes to a stop and either immediately begins to close or begins to close after a field adjustable period of time (adjustable from 5 to 60 seconds). The time delay is reset automatically as long as the door is being opened, or a presence sensor indicates that a person is in the active swing area of the door. The time delay is also automatically reset in the event that the push plate, or other input device, is reactivated.

In the fully automatic opening mode of operation, door opening speed is controlled such that the kinetic energy of the door never exceeds 1.25 ft-lb. This mode, when selected, is also activated by a push plate, IR or RF remote link, or by the push and go feature. Safety and time delay features, as discussed above are also employed in this mode.

For both modes, if a power failure occurs while the door is being opened under power, spring 91 will return shuttle assembly 71 to its home position and the door will close as always under the influence of mechanism 31 without impact on closing motion from assembly 71. Until power is restored the operator will default to its normal (manual) mode of operation. Optional battery backup package 109 (FIG. 2) allows up to 1 hour of powered emergency operation of the door.

In either of the powered modes of operation, the apparatus tolerates pedestrian interference at any point during the opening or closing cycles of the door. If a pedestrian attempts to arrest the motion of the power assisted door, a maximum of 15 lbs. applied 1" from the latch edge of the door will stop the motion of the door. If a pedestrian attempts to arrest the motion of an automatically opening door, power is quickly removed from motor 93 so that the kinetic energy (1.25 ft-lb. maximum) of the door can be overcome by the pedestrian. If a pedestrian attempts to speed up the motion of the door, the apparatus provides the usual resistive force of mechanism 31.

During the closing cycle of either powered mode of operation, piston 37 and shuttle 85 can be caused to remain in continuous feather contact or in braking contact (as discussed below, the controller is able to detect the closing force of the piston on the shuttle). If controller 113 senses that the piston is not pushing against the shuttle at any time during the closing cycle, it will stop closing the door and balance the forces on the door by utilizing the assist capability of the controller (fully automatic opening mode) or reactivate the power assist (power assist mode).

Two doors may be configured for simultaneous opening (e.g. side by side doors) or for the delayed opening of the second door (e.g. for a vestibule application) utilizing the apparatus of this invention. For simultaneous opening of two doors, an actuating signal is sent from the chosen input source to the controllers of two apparatus 15. The vestibule function provides for the opening of the second door as soon as the first door has completed its closing cycle by using the slave connections on both controllers, the slave connection operating as an output on the controller of the first door and an input on the controller of the second door. A safety switch (or a pair of safety switches, one associated with each door) is provided in the vestibule area which, upon actuation, will serve to open both doors.

Turning now to FIGS. 2, 8A, 8B and 9A through 9C, apparatus 15 receives power at the "LINE IN" terminal block. The line is appropriately fused. The line voltage is switched by "POWER" switch 164 and applied to the power supply 110 transformer primaries. The transformer secondaries are connected in series and the resulting 15 Vdc (nominal) is sent to the controller. "MODE" rocker switch 154, motor 93, battery module 109 and motor shaft encoder 111 are connected to controller module 113. The installer may connect a number of devices to the "EXTERNAL" options terminal block of the controller module.

Regulator 114 filters the 15 Vdc (nominal) signal from power supply 110 the signal to provide +20 Vdc supply. This supply powers motor driver 115, electric strike driver 117 (a device to unlatch an electrical door locking mechanism), the electronics, a 5 V regulator and any external sensor, and is available to provide charging current for the optional battery adapter.

Clock 120 generates 12 MHz for processor 121 using a crystal. This clock is also used by pulse width modulator 123. Regular pulses are generated which reenable COP (Computer Operating Properly, also called a watchdog) circuit 125 which includes a D-type flip-flop that is reset at power-up. The pulses are AC coupled, so that their absence can be detected regardless of the level of the output. In the absence of such pulses, after a small delay, the flip-flop is set. This in turn activates a transistor which disables motor driver circuit 115 (the controller does not reset COP circuit 125, but rather resetting is achieved by cycling the power off and then on).

Through port 127 processor 121 reads the state of the devices connected to the "EXTERNAL" options terminal board and from the "MODE" switch. These lines are pulled up to the +5 V or the +20 V supply and filtered to decrease noise and to isolate the processor from any surges.

Through port 129 processor 121 reads the state of DIP switches 133 (installation and mode selection switches). Through port 135 processor 121 reads the setting Of adjustment switches 156 and 160 (opening time/force and closing delay time controls as discussed herein after). It also reads the motor current and the voltages on the two motor terminals (at 144).

Processor 121 uses port 136 and port 140 (at "DIR") to read motor shaft encoder 111. The encoder phases drive D-type flip flop 138, the output from which remains high if the motor turns in the direction of opening the door and low otherwise. At each processor interrupt generated by one of the phases (at port 136), processor 121 reads the state of the output from flip flop 138 (at port 140) to determine motor direction, and measures the time elapsed since the previous interrupt to calculate motor speed.

Processor 121 drives an optional electric strike plate through a power current source which uses a darlington transistor. Processor 121 monitors the collector voltage of the darlington transistor at port 140 to determine if an electric strike is installed. A rectifier bridge allows the use of DC and/or AC strike plates.

Through port 137 processor 121 drives a two color LED 139 to report system status (faults or the like), and reads the settings of the "SIZE" and "ANGLE" adjustment switches 162 and 158 respectively (operator set switches to indicate the size of door with which the apparatus is connected and opening angle to back stop).

Clock 120 provides modulator 123 with a byte proportional to the desired duty cycle (On time). The two synchronous binary counters divide the 12 MHz clock down, counting from 0 to 255 and then again from 0. The count repeats at a 47 KHz rate. The two 4-bit comparators compare the instantaneous count with the modulator byte from processor 121. While the count is less, the comparators' output is high. This results in a 47 KHz square wave whose On time is proportional to the modulator byte. Through the PWM Enable line at port 140, the processor may clear the counters to disable driver 115.

Motor driver 115 powers actor 93 using quasi-H bridge circuit formed by a pair of field effect transistors (MOSFETs) and two fast fly-back rectifiers with motor 93 in the horizontal arm of the bridge. When the MOSFETs are on, power is coupled to motor 93 in the forward polarity. When the MOSFETs are off, the current in the motor's inductance is diverted through the fly-back rectifier diodes back into the supply.

This arrangement allows the motor to be driven in one direction and to be braked in the opposite direction. When a door associated with the apparatus of this invention is closing, the motor becomes a generator. By turning the MOSFETs on, they connect power to the motor thus allowing braking of a closing door if desired.

At motor monitor 144, one of the MOSFETs' current is routed through a current sense resistor. An OP-AMP amplifies the voltage across the resistor and sends it to port 135 of processor 121. Two resistor dividers sample the voltages at either end of the motor and send them also to port 135 of processor 121.

The optional battery adapter (109 in FIG. 2) includes a 12 V rechargeable battery pack, a rectifier to allow full battery current to power the controller, a fuse to protect the battery from accidental shorts, and a charger. While the operator is AC powered, the controller provides the battery adapter with an unregulated +15 Vdc nominal. The rectifier is reverse biased and the adapter charges its battery with this voltage through the charger. While the operator AC power is removed, the full battery voltage is available to the controller through the rectifier and the fuse.

The servo system thus defined operates as a squaring-integrating type. A reference (current, velocity or both) is compared to actual readings. The error is amplified and integrated. Depending on the magnitude of the error, this integrand is either a linear or a square function of the error. This method results in a self-adjusting servo, the gain of which is large for large errors and decreased for smaller errors. The integrand is subtracted from the integral (in order to generate negative feedback, drive is decreased for a positive error and increased for a negative error). The resulting servo drive signal is output to pulse width modulator 123 driving motor 93.

The software timer is continuously incremented. It is restarted each time a new operating state (as discussed hereinbelow) is entered. Controller 113 checks each variable to assure it is within the expected limits for the given operating state. Specifically, it checks the motor current, shuttle velocity and the real timer. The controller also checks the ROM through signature analysis and proper operation of the RAM.

Controller 113 operates basically as a state machine under program control as illustrated in FIGS. 10D through 10G or FIGS. 11 through 19 for operational control of the apparatus of this invention. Information utilized for control as described hereinbelow is gathered and or sensed from various sources (for example, from standard and known operating parameters of motor 93 and springs 45 and 91, gear ratios of gear train assembly 95, operator settings, unit configuration at DIP switches 133, current and voltage monitor 144 and shaft encoder 111).

The relationship between the door and motor angles, between their torques and between their velocities are non-linear. They depend on the non-linear coupling between the operator and the door (i.e., control arm 32 for push open mountings or sliding track arms or the like for pull open mountings). Mechanics of these non-linear couplings are internally computed and utilized in controller 113 through use of the gamma function, the ratio of input to output velocities and the inverse ratio of input and output torques. The gamma function is angle dependent and, in the case of non-linear couplings, is a variable ratio.

Figure 10A:
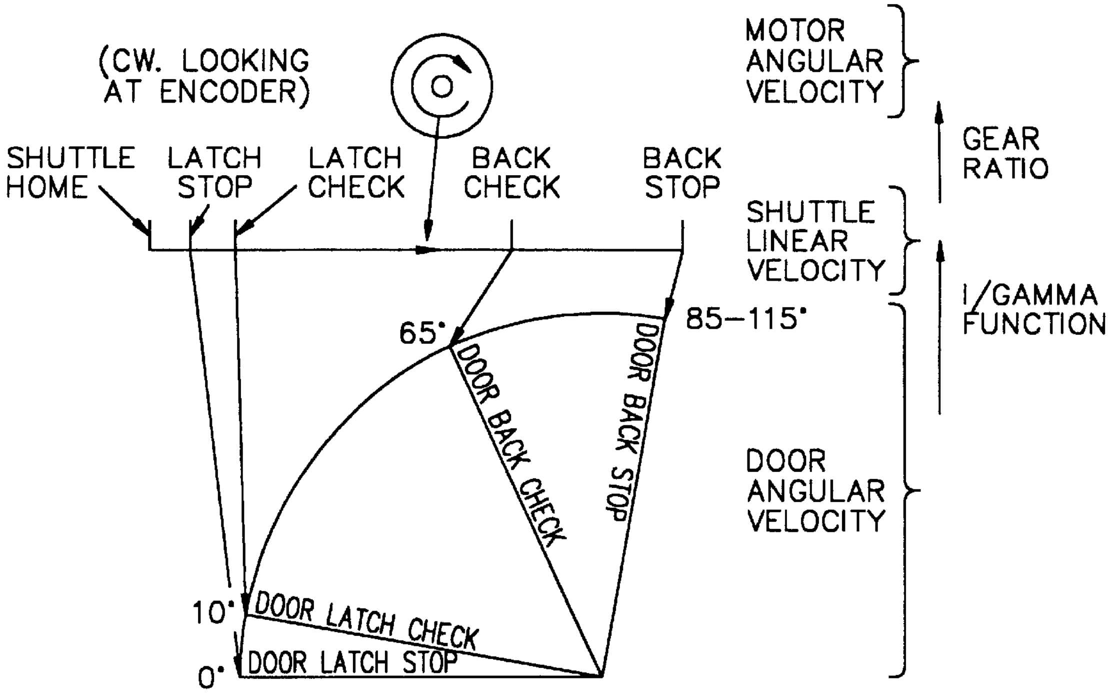
FIG. 10A through 10G are charts illustrating a first embodiment of operational control of the apparatus of this invention.
Figure 10B:
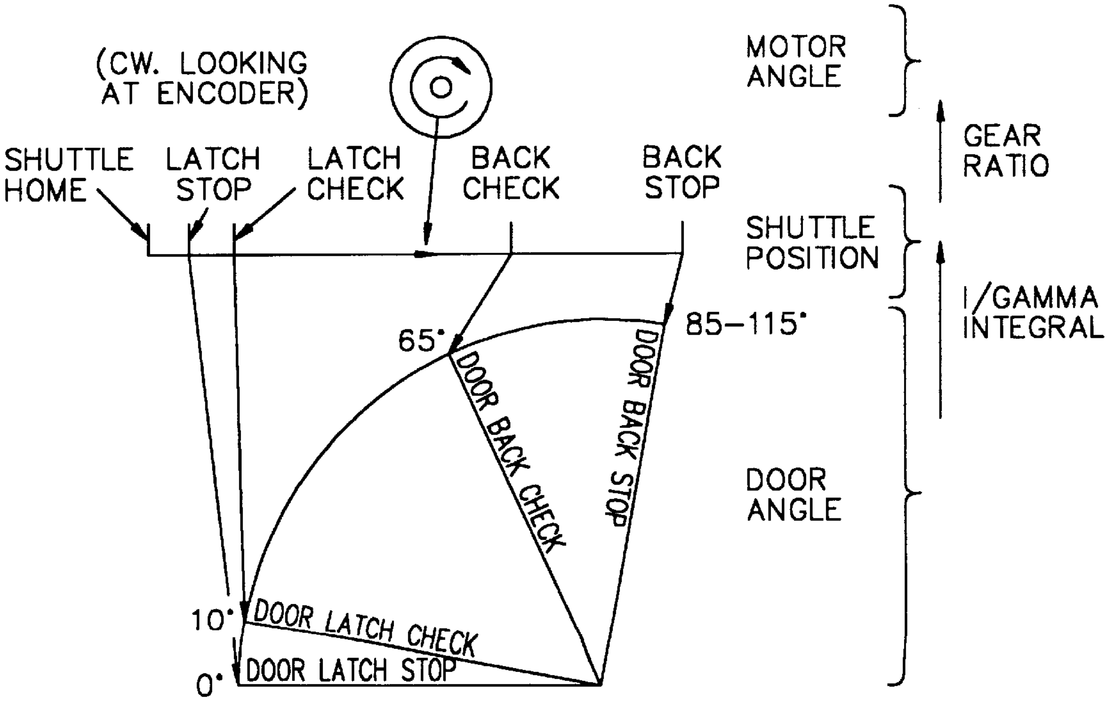
Figure 10C:
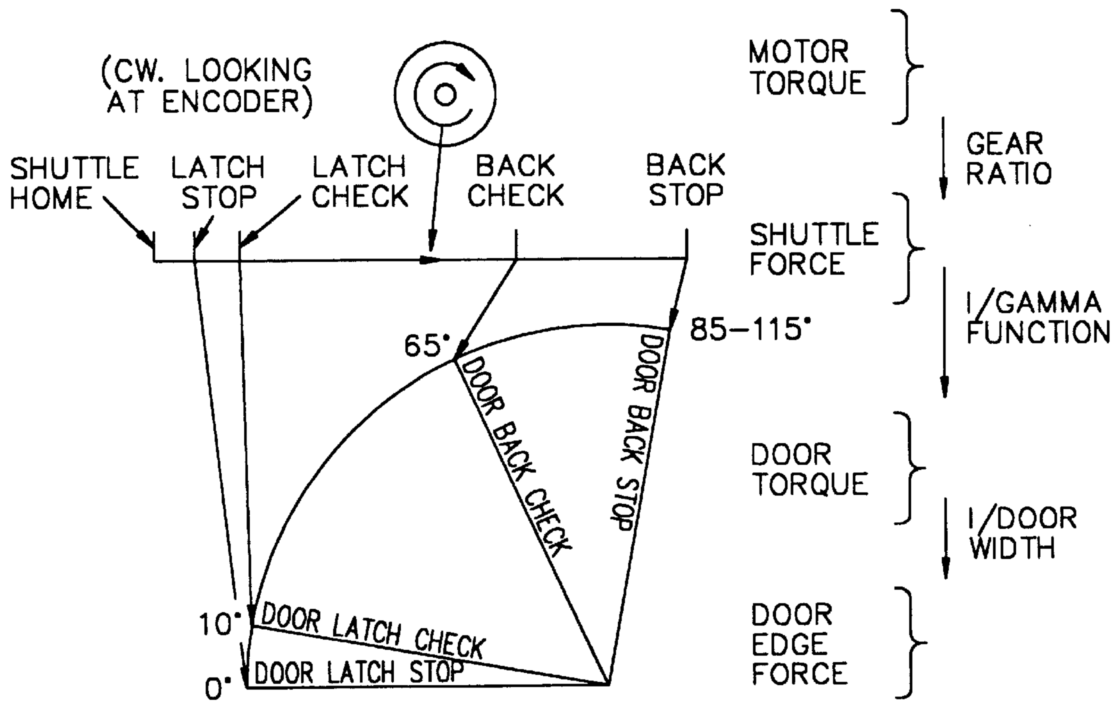
Figure 10D:
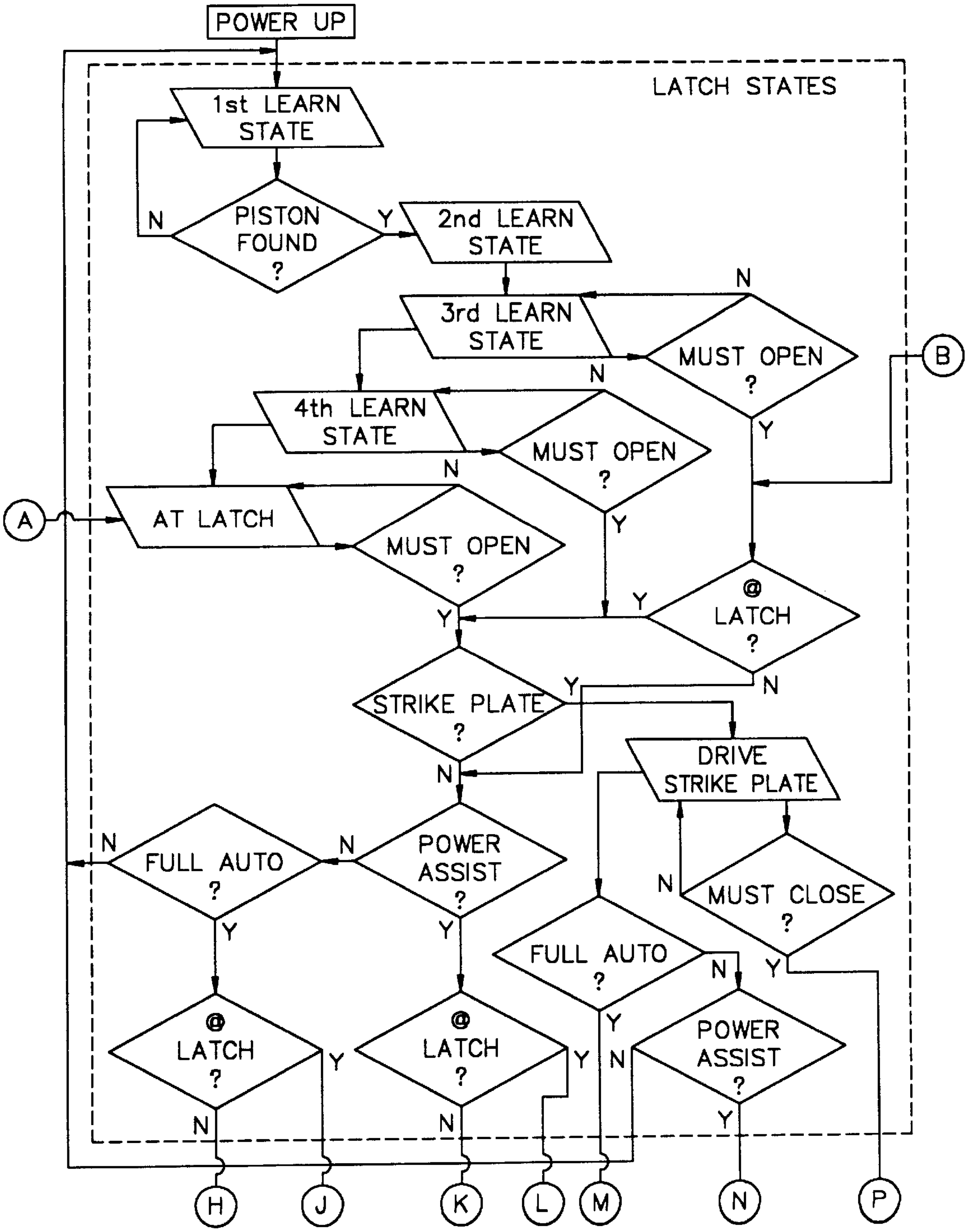
Figure 10E:
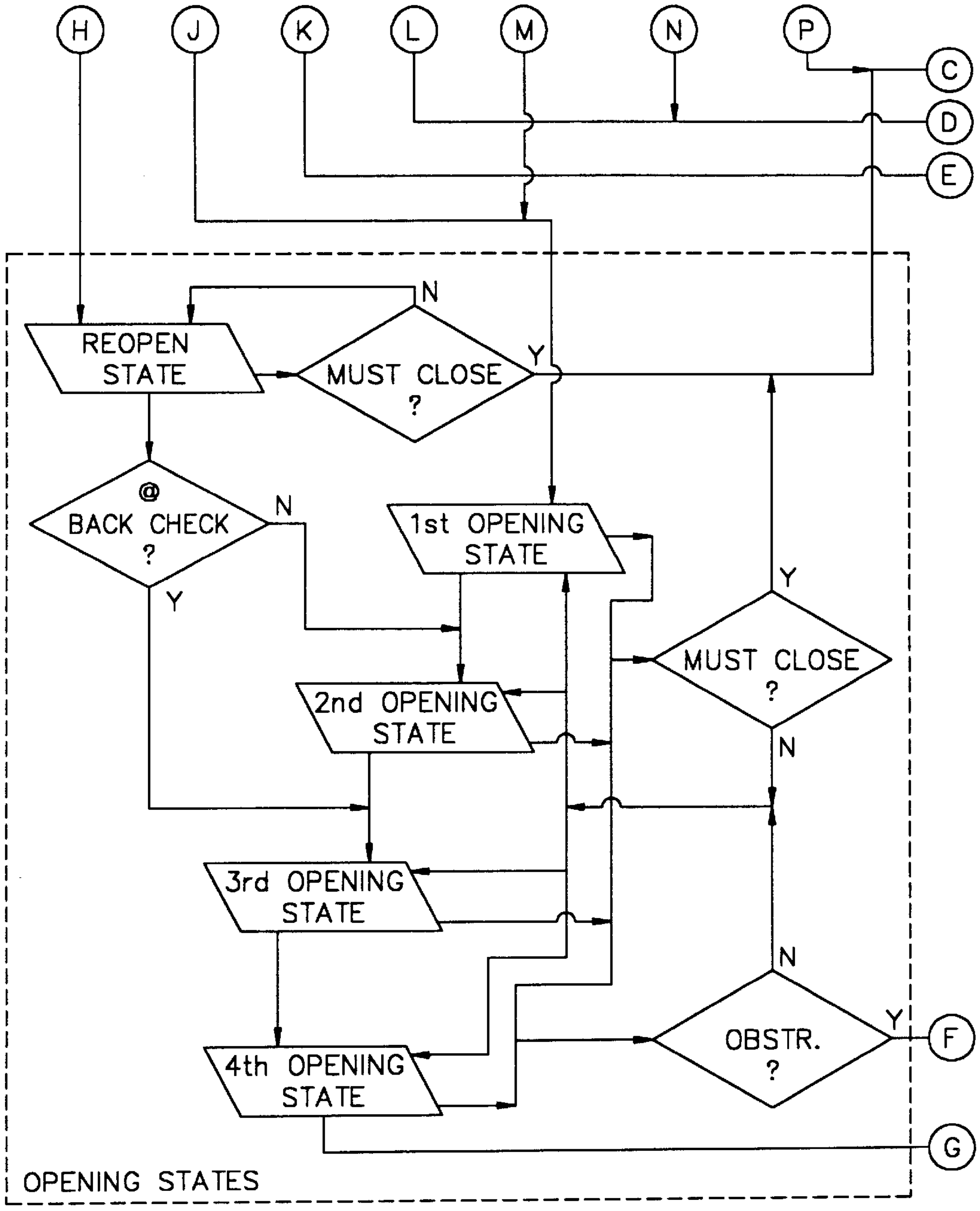
Figure 10F:
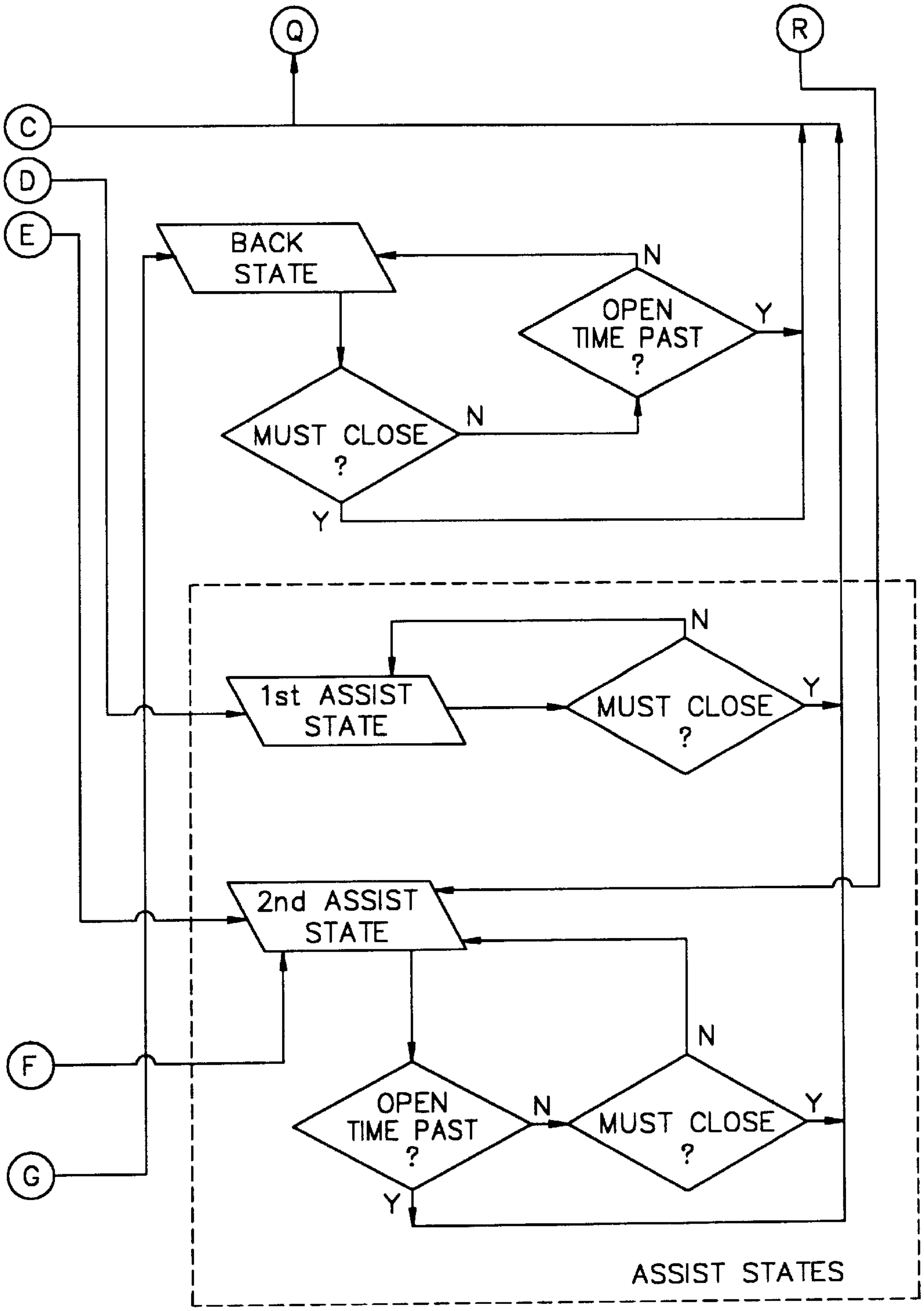
Figure 10G:
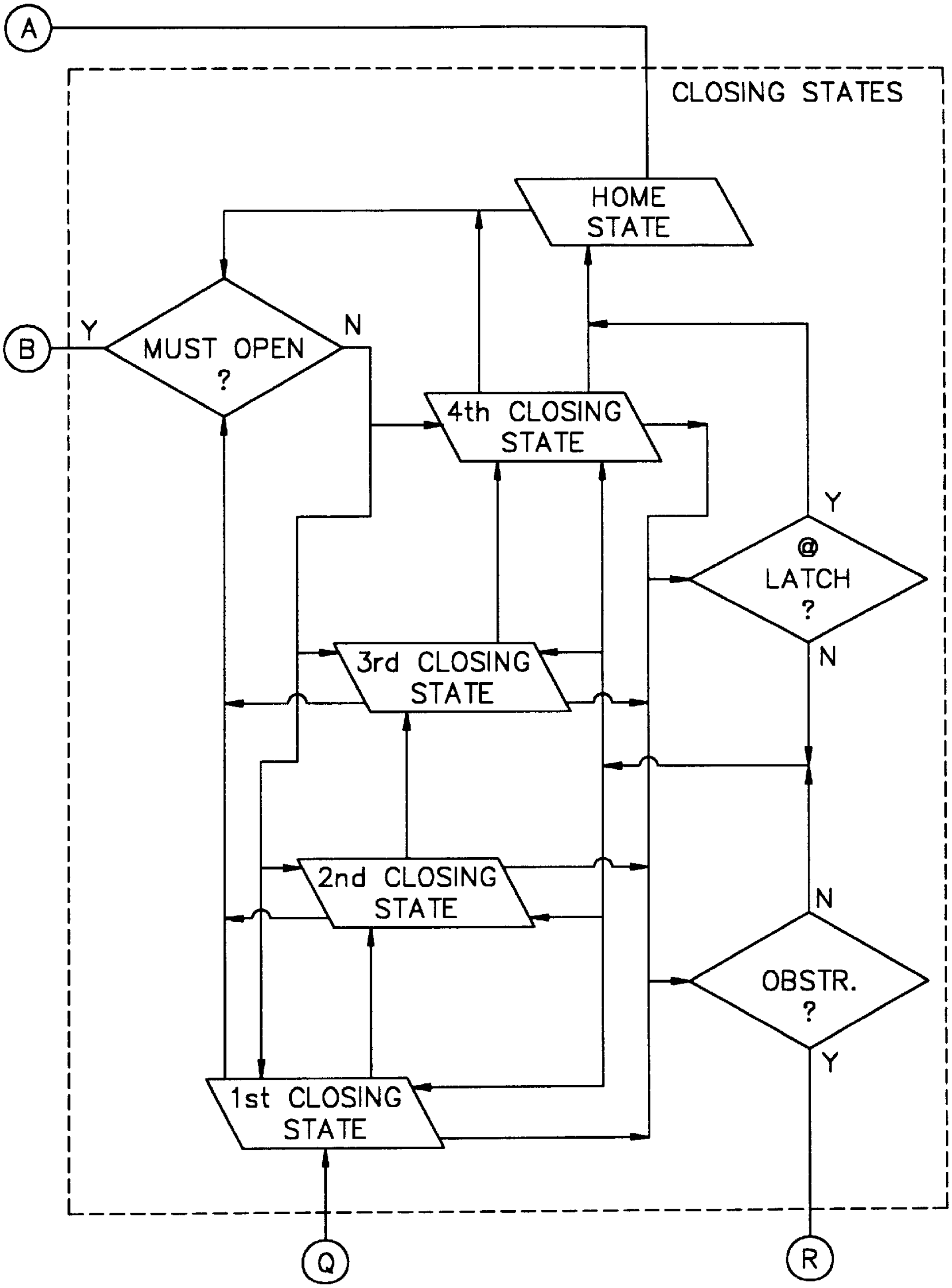
Figure 13:
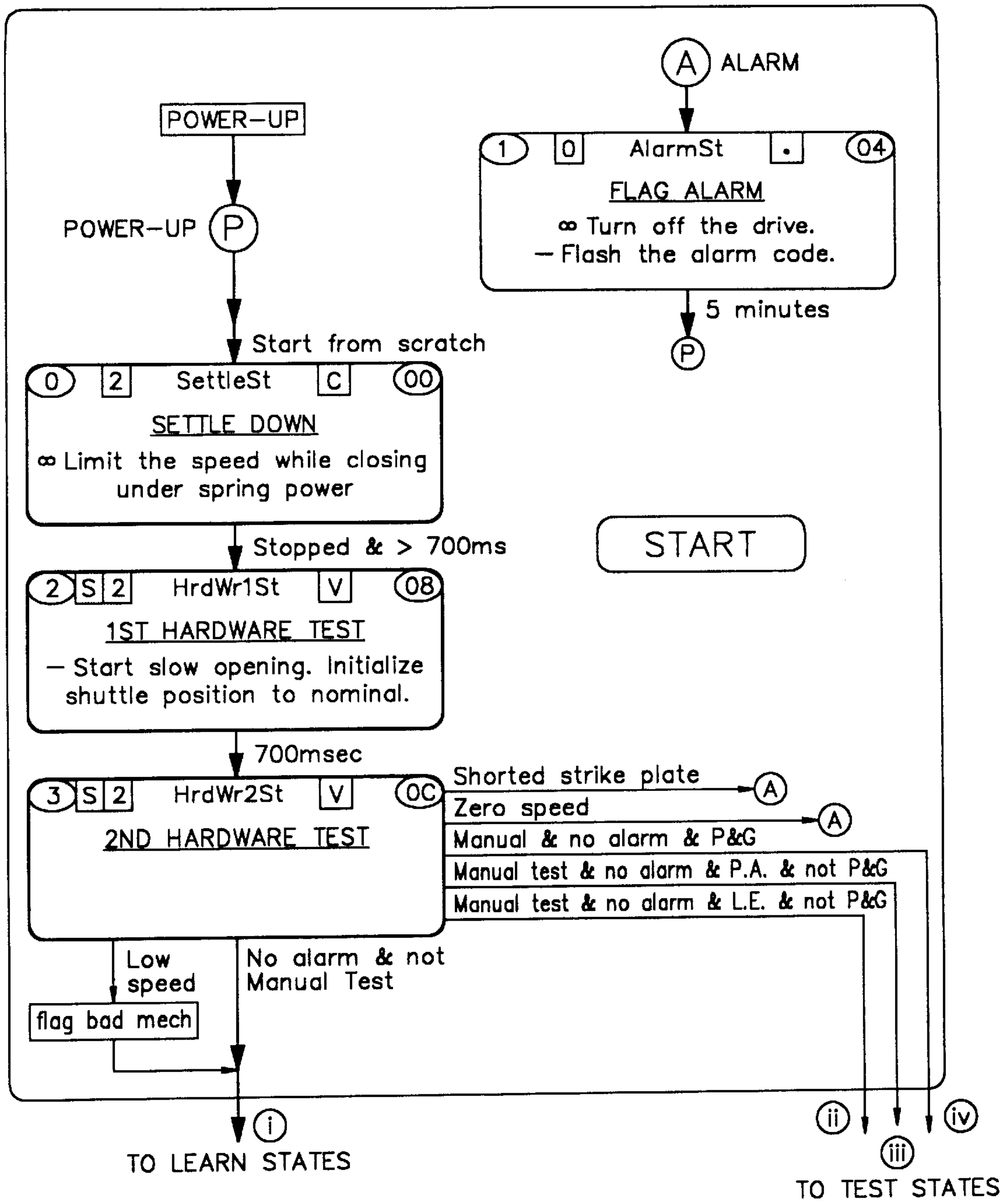

The gamma function determines the response at the door for a given movement at output shaft 33 of mechanism 31. While the actual gamma function will vary from installation to installation, due to variations in door jamb width, accuracy of installation and the like for example, such variations are, for standard installations, within a range of tolerance such that adequate door control can be achieved by using a single set (related to installation and door size) of precalculated values of gamma verses door angle. For a typical push side mounting, gamma may vary from about 0.2 for the fully closed door to about 0.8 when the door is open to 115°. For pull side mounting, gamma may vary from about 0.5 for a fully closed door to about 1.5 for a door which has been opened to 115°. FIGS. 10A–C illustrate the relationships between motor 93, shuttle assembly 71, output shaft 33, door pivot 150 and door edge 152 (FIG. 1).

Turning now to FIGS. 10D through 10G .Illustrating a first embodiment of the program control of this invention, when the unit is first activated (power-up), the program initializes the hardware and enters the Latch group of states, those states in which a closed door remains when not in use and which is initially utilized to learn installation dependent operating parameters such as the position of piston 37 of mechanism 31 when the door is at the fully closed position and the combined preload of springs 45 and 91.

The Latch group of states comprise six States (including three learn states). In the first learn state, shuttle assembly 71 is driven into contact with piston 37. If piston 37 is not encountered within a reasonable parameter, the system is restarted. In the second learn state, the position of the shuttle assembly when in contact with piston 37 of a fully closed door is learned (i.e., the latch-stop position) with reference to sensed motor current from current monitor 144 and shaft encoder 111. Piston 37 is driven just beyond the fully closed position of the door ( i.e., just beyond latch-stop).

In the third learn state, the combined spring 45 and 91 preload is encountered and learned with reference to monitored current and shuttle 85 is driven back to a position just in advance of latch-stop. In the fourth learn state, end 105 of shuttle 85 is brought back to latch stop position. Shuttle 35 is then maintained in this position (if the push and go feature is activated at DIP switches 133, shuttle end 105 is pressed against piston 37 in order to sense door movement and to follow piston 37 thereafter). If there is a strike plate, the strike plate is driven and door opening is delayed in the drive strike plate state.

To exit the Latch states, if any of the must open conditions are met (i.e., when the door is at latch stop and a signal is present at the open trigger input to controller 113 indicating an activated push plate, motion detector or the like, when a signal is present at the slave trigger input used in vestibule applications, when the push and go feature is activated and the door is opened a distance from latch stop, or when the door is not at latch stop and a signal is present at the open trigger input or mode switch 154 is set to keep the door open) and any strike plate delay is complete, operational control moves to the Opening states (in the fully automatic opening mode) or the Assist states (in the power assist mode of operation), depending upon setting at the appropriate DIP switch 113.

In the Opening states, the program, opens the door to the back stop (respecting A.N.S.I. regulation as to opening speed). In a regular opening cycle with the door starting at the latch stop position (and the operating personnel having preset the desired opening time at the "Open" adjustment switch 156, which is limited to an opening speed within A.N.S.I. specifications, and having established the back stop position at the "Angle" adjustment switch 158), the door is opened with speed increasing linearly until it reaches a plateau velocity. The plateau velocity is such that, as the plateau speed is maintained up to back check (i.e., at about 65° of fully opened), it opens the door in the desired opening time. Past back check, the operator decelerates the door to reach a crawl speed (arbitrarily defined) and continues opening the door at the crawl speed. If a strong back check force is used, the door speed through back check is limited by the power supply's power limitations.

If the Opening states are entered with the door between latch stop and back check, then the door speed is changed from its then current velocity to the plateau velocity of the previous cycle, continuing thereafter as in a regular cycle. It the Opening states are entered with the door beyond the back check position, door opening speed is started at the crawl speed, and then continues as in a regular cycle.

When the door reaches the back stop, the program exits to the Back state. If an obstacle interferes with the opening door, the program exits to the Assist states. During acceleration or at plateau speed, interference is detected if, in order to maintain the speed of the motor (within a selected range), the servo must increase the drive to its maximum drive or to the point that it generates a force equivalent to more than 15 lb. at the edge of the door. Past the back check position, this is detected if the door is stopped and the servo must increase the drive to its maximum drive.

The Opening states include six program states. The reopen state reverses a closing door's direction. In the first opening state, the door is accelerated to the plateau speed. In the second opening state the strike plate drive is turned off and the door continues to open at the plateau speed. The door is decelerated to the crawl speed in the third opening state and is brought to the back stop in the fourth opening state.

If the Must Close conditions (i.e., if a signal is detected on the close trigger input to controller 113, for example from a push plate, smoke alarm or the like indicating that the door must immediately close, or if mode switch 154 is set in the don't open position) are met at any point in the Opening states, functional control shifts to the Closing states.

In the Back state the program holds the door at the back stop for the time period established by the setting of adjustment switch 160 by operating personnel and advances a timer. Just enough torque is generated to overcome the force of return springs 45 and 91 to hold the door at the back stop.

If an obstacle is sensed in the door swing area (for example, by signal from a mat sensor, presence detector or like device positioned adjacent to the door way with the signal received at the "Busy Swing Area" input to controller 113), or if the Must Open conditions are met, the program restarts the timer thus further relaying closing of the door. If the timer reaches the set delay time, the program exits to the Closing states. The controller is capable of limiting the delay time in order to prevent overheating of the motor.

In the Assist states, a user of the door is assisted in opening the door by a program controlled reduction of the force required to open the door. Any time the door encounters an obstacle in its swing path, the program will enter these states from anywhere in the program. If the door is at the latch stop, it is moved slightly open (for example, about one inch) to prompt the user. Enough torque is generated to overcome most or all of the torque due to return springs 45 and 91. This allow the user to move the door with a reduced force.

The force that the user must use to open the door is established from the operating personnel setting of adjustment switch 156 (which has a use different than when controller 113 is set at DIP switches 133 for fully automatic opening mode; when set in the fully automatic opening mode, a default force required to open the door in case of an obstacle is utilized). Again, the closing delay time is established from the setting at "Delay" adjustment switch 160 and the program advances a timer. If the swing area is busy (i.e., if a sensor signals a presence in the doorway), if the Must-Open conditions are met, or if the door is moved, the program restarts the timer. If the timer reaches the close delay time, the program exists to the Closing states.

The Assist states include two program states. In the first assist state, when a must open signal is received and if the door is at the latch position, the door is stepped forward a short distance to prompt the user. In the second assist state (entered immediately upon receipt of a must open signal where the door is beyond latch stop position or where an obstacle is encountered by the door during any other door function) force is applied to piston 37 by shuttle assembly 71 to assist the user with door opening. If the Must Close conditions are encountered any time during the Assist states, program control shifts to the Closing states.

In the Closing states, shuttle 85 is kept in contact with piston 37 so that, to latch check positron (at about 10° from the latch stop), the speed of the door under the control of mechanism 31 is limited to a maximum speed (for example, no greater that allowed under A.N.S.I. guidelines, wherein the kinetic energy of the door must be less than 1.25 ft-lb.), and so that, between the latch check position and the latch stop position, speed of the door is limited to provide a selected closing time therebetween (for example, at least 1.5 seconds). The shuttle is then brought to its home position (disengaged from piston 37). If the shuttle reaches its home position, program control reenters the Latch states. If the Must Open conditions are met, control reverts to the select open state of the Latch states. If the door encounters an obstacle, control reverts to the second assist state.

Door closing speed is limited to a profile within the maximum allowed in A.N.S.I. guidelines. Shuttle assembly 71 lets itself be pushed, or urged, by return spring 45 to the closed position so long a closing speeds are within the profile, and limits the speed of the piston (i.e., provides braking) when the closing profile is exceeded. Controller 113 operates in these states as a velocity type servo (though operation could be as a current type servo), but with a minimum current, to ensure that the shuttle remains in contact with the piston even if the piston stops. After reacting the latch stop position, shuttle 85 moves to its home position.

The Closing states includes 5 program states. In the first closing state, the door is allowed to accelerate to a sweep speed (as hereinabove limited). During the second closing state the door closes at the sweep speed, decelerating to a latch speed in the third closing state. In the fourth closing state, the door continues at the latch speed until shuttle assembly 71 is brought to its home position in the home state.

It should be appreciated that other closing regimes could be employed, for example, quick return of the shuttle assembly leaving mechanism 31 totally unencumbered during the closing cycle, intermittent contact upon return to check closing speed, or the like.

Turning to FIGS. 11 through 19, a second, and now preferred, embodiment of the program control at processor 121 of controller 113 is illustrated (the controller is implemented using a state machine model).

FIG. 11 is a flowchart wherein each box represents groups of related Program States. The program starts in the "Start" group, then selects either the "Test" (for manual tests) or the "Learn" group (for normal operation). In the latter case, at exit from the Learn states, the program cycles from the "Closing" group, into the "@ Latch group", then to the "Opening" group (for a Low-Energy type apparatus 15) or the "Balance" group (for a Power-Assist apparatus 15), into the "Closing" group, and back to the "@ Latch" group.

The Start group includes four program states, the Power-up Settling State (SettleSt) wherein the shuttle is allowed to go home under spring power, limiting the torque. When the shuttle stops longer than a short time, for example about 700 ms, the First Hardware Test State (HrdWr1St) is entered. There, software initializes the shuttle position to the nominal Home position and the strike plate is turned on. The shuttle is moored slowly, and about 700 ms later the Second Hardware Test State (HrdWr2St) is entered.

At this point, the shuttle should be opening at a certain speed. If it is stopped, it is assumed that either the mechanics are stuck or the electronics aren't seeing the rotation of the motor, whereupon the Alarm state is entered providing a code of 10 red flashes. If the shuttle is opening, but at too slow a speed, it is assumed that the mechanics are sluggish, and this fact is stored in memory (so that the LED will produce an orange alert code flash). If the strike plate is shorted (that is, there is a voltage across the strike plate driver even though it is turned On), again the Alarm state is entered (at A) with a code of 3 red flashes. If there is no alarm and the manual mode is selected (by a programming jumper on the board) personnel select one of three manual modes and the Test states are entered: if the Push-and-go function is enabled, a cycle test is performed; if not, a manual velocity test (if the Low-Energy mode is selected) or a manual current test (if the Power-Assist mode is selected) is performed. Finally, if there is no alarm and no manual mode is selected, the Learn States are entered.

When an alarm is flagged (AlarmSt) drives to the motor is removed and the alarm code is displayed with red LED flashes. After five minutes, the program is restarted from scratch.

Figure 14:
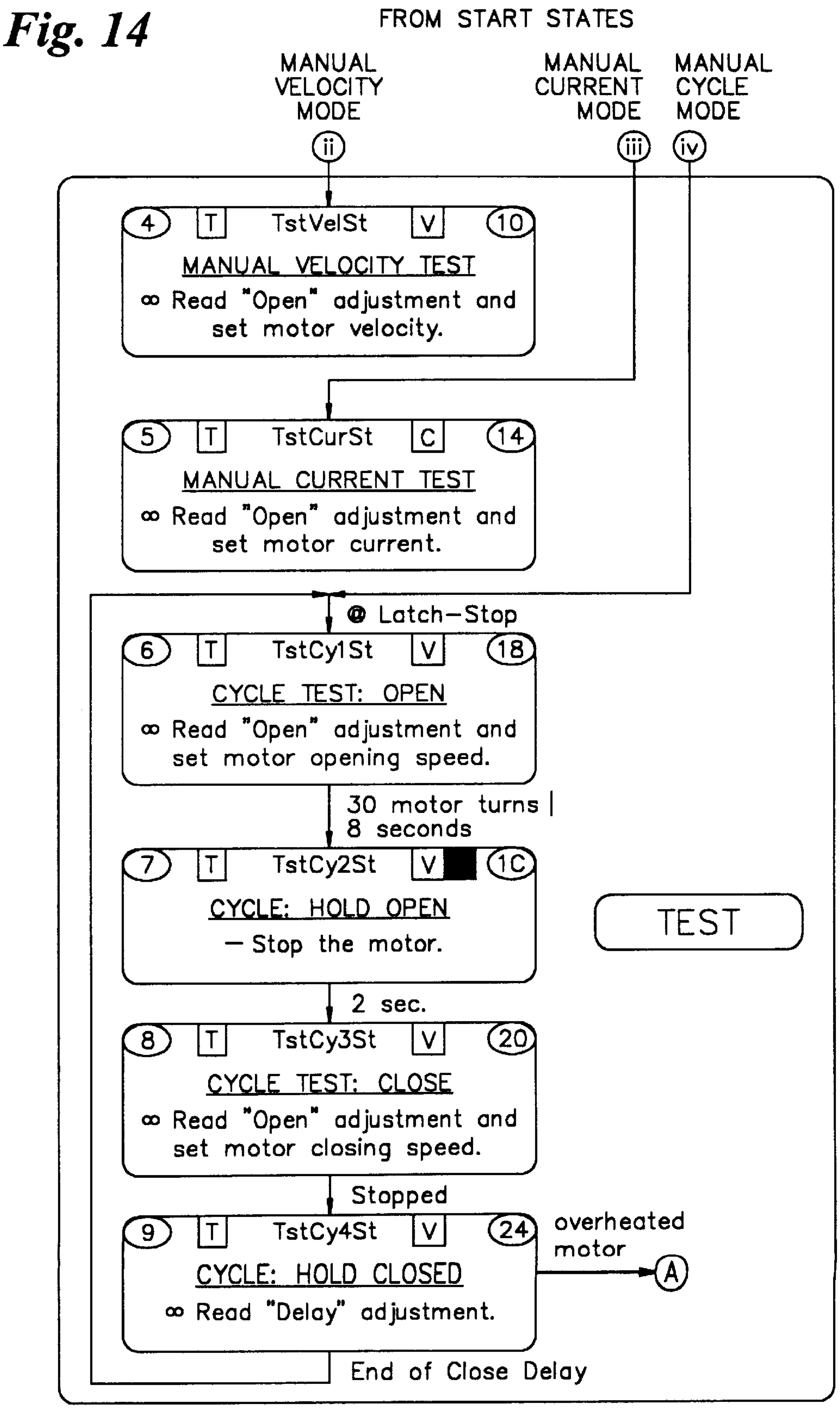

The Test states are illustrated in FIG. 14. If at power up the test configuration switch is set, the program enters this group of States. In this group the program runs one of three manual test routines.

In a velocity test, the shuttle velocity (opening or closing) is set by the "Open" adjustment. In a current test, the motor current is set by the "Open" adjustment. In a cycle test, the shuttle opens and closes at a speed set by the "Open" adjustment, then waits for a time as set by the "Delay" adjustment before repeating the cycle.

This Test group includes six program states. In the Velocity Test State (TstVelSt), the shuttle velocity (opening or closing) is controlled according to the "Open" adjustment. In the Current Test State (TstCurSt), the motor current is controlled according to the "Open" adjustment. In the 1st Cycle Test State (Tstcy1St), the shuttle is moved at the speed set by the "Open" adjustment. When the shuttle reaches a fully open position, or after a time-out of about eight seconds, the next Test state is entered.

In the Second Cycle Test State (TstCy2St.) the motor is stopped and the door is held open. In the Third Cycle Test State (TstCy3St) the shuttle is moved to close the door at the speed set by the "Open" adjustment. When the shuttle reaches its home position, the Fourth Cycle Test State (TstCy4St) is entered with the shuttle waiting at home. If the motor is overheated, the program exits to the Alarm state with an alarm code of two red flashes. After a delay set by the "Delay" adjustment, the First Cycle state is reentered, the Test process continuing until personnel turn apparatus 15 off.

Figure 15:
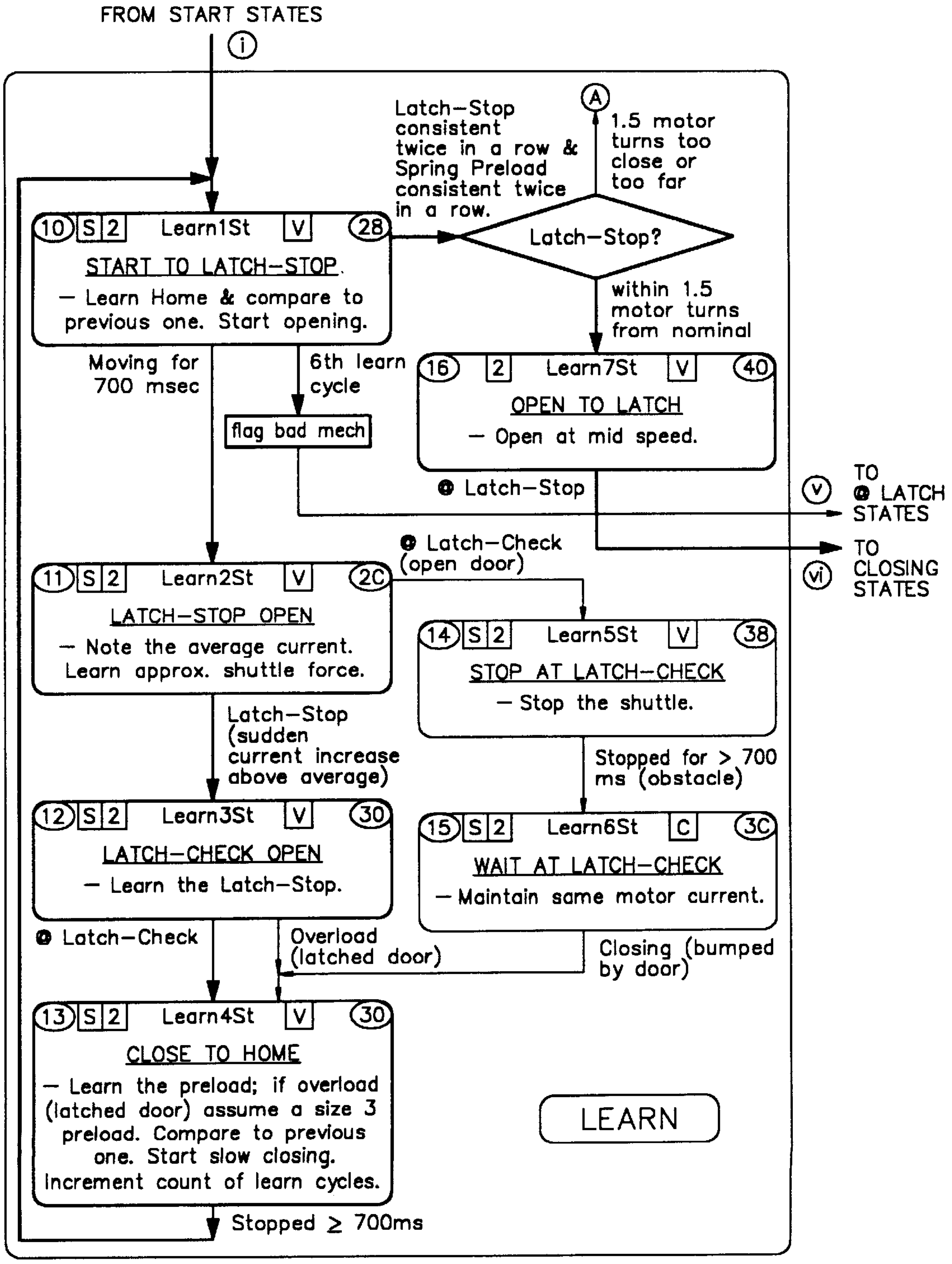

In the Learn group of states (FIG. 15, the program learns some of its installation dependent operating parameters. Controller 113 learns the Latch-Stop (making sure it is within limits) and the combined springs preload, repeating cycles as often as necessary to get two consecutive consistent readings. After six such cycles, the program flags that the mechanics are bad (which causes an orange alert code flash at the LED) and goes on as if the mechanics are fully functional.

This group includes seven program states. In the First Learn State (Learn1St), the shuttle position is saved as the Home position, the position being compared to the previous saved or assumed position and, if the positions are consistent within a certain range, the fact is flagged. This state is entered at each learning cycle. After a few cycles, both the Home position and the spring preload may be already flagged as consistent. In that case, programming checks if the Home position indicates that the arm length is appropriate for the door mounting (push or Pull) within one and a half motor turns. If so, programming exits to the Seventh learning state. If not, the Alarm state is entered with a four red flash alarm code (for a short arm) or a five red flash code (for a long arm). If, after a short time, for example about 700 ms of opening, none of the above happen, programming assumes that the speed is stable, and the next state is entered.

In the Second Learn State (Learn2St), the shuttle is moved to find the Latch-Stop. The average motor current is noted and saved as an indication of the approximate force required to open the shuttle while disengaged from the piston (called the opening force). The program will take a more accurate measurement later, at the end of each opening cycle. If the motor current increases substantially over its average, it is assumed that the shuttle has encountered the piston, presumedly at Latch-Stop. If this does not happen Within the latest expected Latch-Stop, it is assumed that the door is open and the Fifth Learn State is entered to wait for the door.

In the Third Learn State (Learn3St), the door is opened to Latch-Check to learn the Latch-Stop position and door opening is continued. If the motor driver overloads, it is assumed that the door is locked, and the next state in entered. Otherwise, When the door reaches Latch-Check the next state is entered.

The Fourth Learn State (Learn4St) saves the then present motor current as a current value indicative of the spring preload. This is the motor current required to fight the return springs at Latch-Check. At any other position, the motor current required is extrapolated from this number. If the motor driver is overloaded (the door is locked), the spring preload is set to the safest available assumption. The saved spring preload is compared to previously learned preload, if any. If the two match within a certain degree, spring preload is flagged as consistent.

At this point, programming starts moving the shuttle to close the door. When the shuttle stops for more than about a short time, for example about 700 ms, it is assumed that it has reached its home the First learning state is reentered.

The Fifth Learn State (Learn5St) is entered if the piston is not encountered by the shuttle at the maximum position where the Latch-Stop is expected, and it is assumed that the door is open and thus the shuttle is stopped. When the shuttle is thus stopped for a short time, for example about 700 ms, the Sixth Learn State (Learn6St) is entered wherein programming waits for the door, using just enough motor current to overcome the shuttle spring. When the shuttle starts moving in the closing direction, it is assumed that the door has been closed and the Fourth Learn state is entered In the Seventh Learn State (Learn7St) the shuttle is moved to the Latch-Stop position. When at the Latch-Stop, programming exits to the Fourth closing state.

Figure 16:
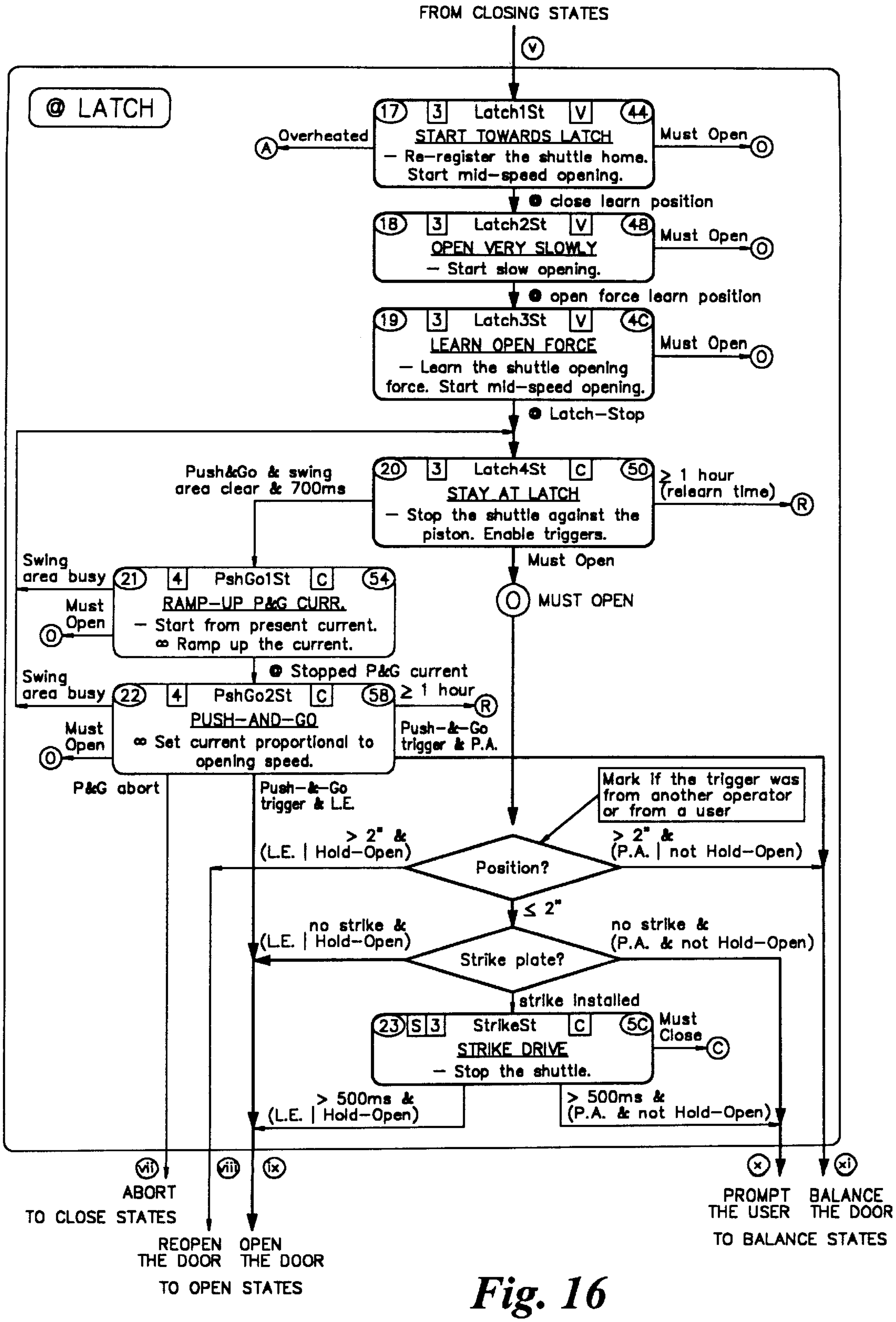

In FIG. 16, the Latch group of States are illustrated. Here the program learns the force (by monitoring motor current) required to slowly advance the shuttle in the opening direction, and brings it to the Latch-Stop. If the Push-and-Go feature is enabled, the shuttle follows a door that is opened by a user. If an optional electric strike plate is installed, the program starts driving it before opening the door and continues driving it until the door reaches a prescribed open angle.

If the Push-and-go feature is enabled, controller 113 ramps the motor current up to the Push-and-Go current. Then, the shuttle follows the pistor as a user opens the door. The user can generate a valid Push-and-go trigger in two ways: by slowly opening the door until its edge opens 1 inch; or by opening the door fast, but letting it slow down before it reaches 45°. The user can generate an invalid Push-and-go trigger in two ways: opening the door less than 1 inch, or continue opening the door past 45°, without slowing down. In the first case the door will stay slightly ajar until the end of one hour, when the program moves the shuttle for recalibration. In the second case, the program aborts the Push-and-Go trigger.

Many of the states below check the Must-Open conditions. These can be met if the motor is cool, the Close switch is not pressed, and the triggers are enabled (they are disabled at start-up and they are enabled only after all the operating parameters have been learned). Then, the Must-Open conditions are met if either an Open Trigger occurs (the user pressed the button), or a Slave trigger occurs (the other operator in a pair has completed a cycle), or personnel pressed the Hold-Open switch. If the Must-Open conditions are met and a strike plate is installed, the controller drives it and delays the opening.

If the must open conditions are met, based on the conditions and the operating mode, the program may open the door, reopen it (if it was not at Latch-Stop), prompt the user by stepping the door forward, or balance it. Note that, in case of a Push-and-go trigger, the program neither drives a strike plate (since a strike plate is not compatible with the Push-and-Go function), nor does it prompt the user (who is already pushing the door).

This group includes seven program states. In a normal operating cycle, the program enters this group of States at the First Latch State. However, when the Must-Open conditions are met, the program enters this group directly (at O).

In the First latch State (Latch1St) the shuttle starts towards the Latch-Stop. The shuttle position is reregistered by setting the current position as the Home position and opening is started slowly and the Must-Open conditions are checked. If the motor is overheated, programming exits to the Alarm state with an alarm code of two red flashes. When the shuttle reaches the position where the shuttle closing force is learned, the Second latch State (Latch2St) is entered.

Here the shuttle is moved in the open direction even more slowly and the Must-Open conditions are again checked. When the shuttle reaches the position where the shuttle opening force is learned, the Third latch State (Latch3St) is entered and the shuttle opening force is learned. The motor current is saved as the force required to open the shuttle while not in contact with the piston and opening is continued at a middle speed. Again the Must-Open conditions are checked.

When the shuttle reaches Latch-Stop, the Fourth latch State (Latch4St) is entered wherein the shuttle is held at the Latch-Stop position and the Must-open conditions are checked. Programming waits a short time, for example about 700 ms, for the shuttle to stop, then, if the Push-and-Go feature is enabled and the swing area is clear, the next state is entered. After one hour in this state, programming exits to the Fourth Close state to recalibrate the shuttle opening and closing forces.

In the First Push-and-Go State (PshGo1St), the motor current is slowly ramped up to the Push-and-Go current and the Must-Open conditions are again checked. If the swing area is busy, programming returns to the Fourth Latch State. When the Push-and-Go current is reached, if the shuttle is stopped programming enters the next state.

In the Second Push-and-Go State (PshGo2St) the shuttle is pressed against the piston in order to be able to follow the door. The Push-and-Go current is varied in proportion with the shuttle speed. This results in a low current when the shuttle is stopped (to prevent the Push-and-Go current from opening the door) and a high current when the user is moving the door to give the shuttle enough force to follow a fast piston. After one hour in this state, programming exits to the Fourth Close state to recalibrate the shuttle opening and closing forces.

If the user generates a valid Push-and-go trigger, for a low-energy door opener programming exits to the First Open state, while for a power-assisted door opener programming exits to the Balance state. If the user generates an aborted Push-and-go trigger, the First Abort state (one of the Closing States) is entered. If the swing area is busy, programming returns to the Fourth Latch State. As before, the Must-Open conditions are checked.

In the Strike State (StrikeSt), a delay, for example about 500 ms, is followed, for a low-energy type door or if the Hold-Open has been activated, by program exit to the First Opening State. For a power-assist type door, after the delay programming exits to the Prompt State. If the door is open more than two inches (and therefore outside the influence of a strike plate), for a low-energy type door or where the Hold-Open switch is activated, the Reopening State (one of the Opening States) is entered. In such case for a power-assist type door, programming exits to the Balance State.

If the door is open less than two inches (and therefore within the influence of a strike plate), and if the strike plate is installed, programming exits to the Strike Drive state. If no strike plate is installed, for a low-energy type door or if the Hold-Open switch has been activated programming exits to the First Opening State. If a power-assist type contoller configuration is indicated, the Prompt State is entered.

Figure 17:
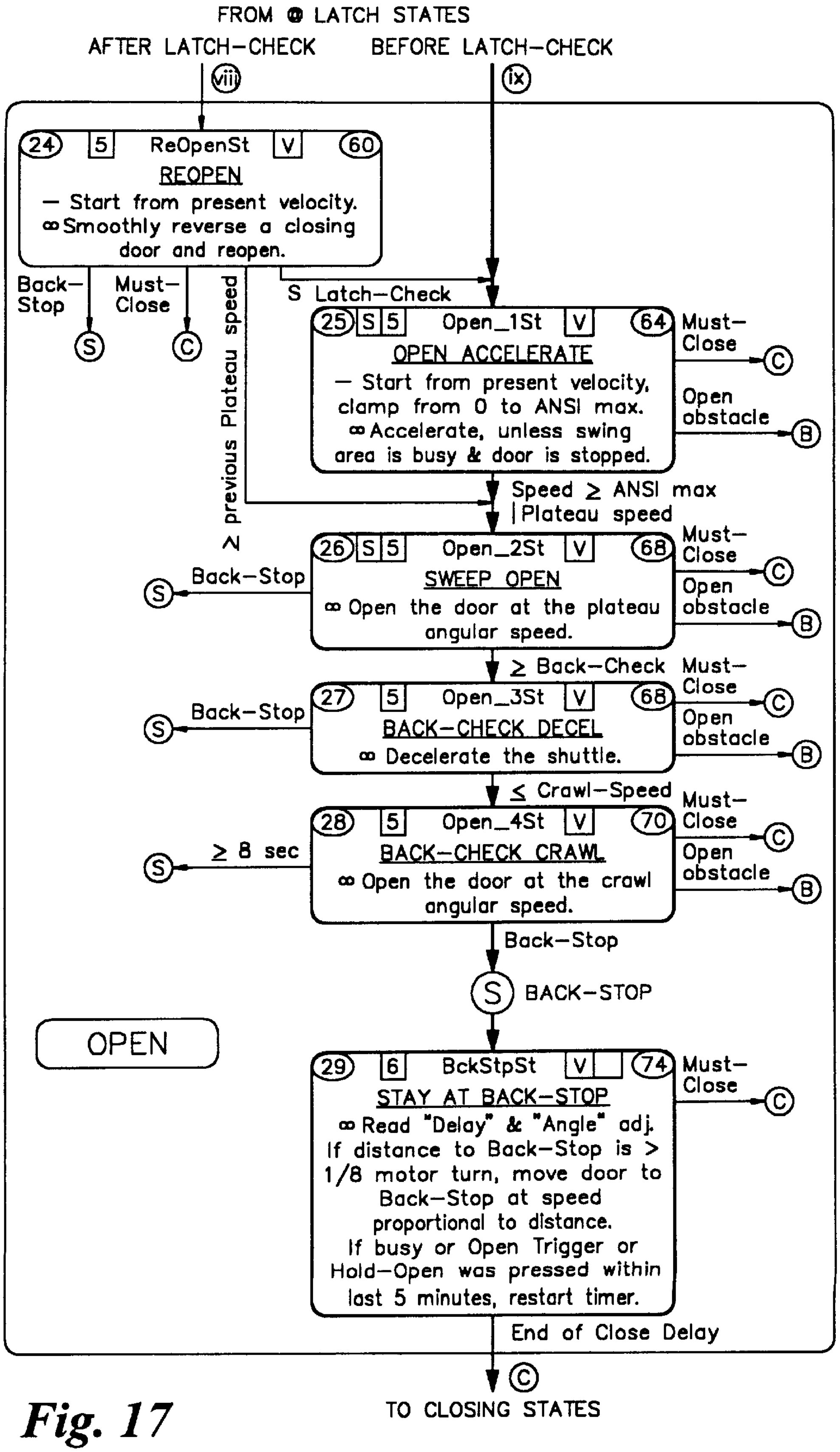

Turning now to FIG. 17, in the Opening group of states the program opens the door to the Back-Stop respecting A.N.S.I. regulation. In general, these states are performed by a low-energy type operator (i.e., when the power-assisted opener features are disenabled at switches 133). If personnel activate the Hold-Open switch, the program enters these states, even for a power-assist operator. In a regular opening cycle, the door starts from being stopped at Latch-Stop and controller 113 sets the opening time from the "Open" adjustment, which is limited to A.N.S.I. specifications, based on the selected door size.

First controller 113 increases the door speed linearly until it reaches a Plateau velocity, which is such that, as controller 113 maintains the plateau speed up to Back-Check, it opens the door in the desired opening time. Then apparatus 15 opens the door to Back-Check at the constant angular Plateau velocity. Past Back-Check, controller 113 decelerates the door to reach a Crawl velocity and, then, opens the door at the Crawl velocity.

If a strong back check force is used, the door speed through Back-Check is limited by the energy available from the power supply. The "Angle" adjustment defines the Back-Stop position. When the door reaches the Back-Stop, it is allowed to overshoot it by a fixed distance, so that the door can then reach the Back-Stop in the closing direction. In so doing, the program minimizes the current required to hold the door open, since it takes full advantage of static friction.

The program sets the close delay time from the "Delay" adjustment. The program, advances a timer. If the swing area is busy or the Must-Open conditions are met, the program restarts the timer. If the timer reaches the close delay time, the program exits to the First Close state.

If the user generates a Push-and-Go trigger, the program starts the velocity reference at the actual shuttle velocity, unless the user is opening the door faster than the maximum A.N.S.I. speed, in which case it starts it from that maximum speed. It then continues opening the door as in a regular cycle. If controller 113 is retriggered while the door is open beyond Latch-Check, the program smoothly decelerates the door (if it was closing) from the current speed and accelerates it to the plateau velocity of the previous cycle, thereafter continuing as in a regular cycle. If the door is between Latch-Stop and Latch-Check, the program operates as in a regular cycle.

If an obstacle interferes with the opening door, the program exits to the Balance state. An interference is detected if, in order to maintain the speed, the servo must increase the drive to its maximum level, and the velocity drops below one 16th of a reference value. If the door is not at the Back-Stop when it should be, controller 113 attempts to bring it there, at a velocity proportional to its distance from the Back-Stop. Therefore, the door will follow the setting of the "Angle" adjustment as it is being changed. If the door is close enough, it does not try to bring it exactly at Back-Stop, because that would mean having to fight both static friction and Back-Check force.

The door speed through Back-Check may be limited by the energy delivered by the power supply. In that case, controller 113 attempts to open the door up to eight seconds, then it goes to the Back-Stop state even if the door is not at the Back-Stop. If the user activates the Hold-Open function, a timer forces the Must-Open conditions to be true for five minutes. Therefore apparatus 15 goes through an opening cycle and holds the door open for five minutes, plus the close delay time. The Must-Close conditions are met if the user pushes the "Close" switch, or if the motor temperature is too high. In that case, controller 113 closes the door.

The Opening group includes six program states. The program enters this group into the 1st Open state (if the door is at the Latch-Stop or, in any case, before Latch-Check) or into the Reopen state (if the door is past Latch-Check). It then proceeds to the other states. In all these states, if the Must-Close conditions are met, the program exits to the First Close state (at C, FIG. 19).

In the Reopen State (ReOpenSt), a closing door's direction is smoothly reversed. If the door is before Latch-Check, the First Open State is entered If the shuttle speed reaches the Plateau speed, programming exits in the Second Open State. If the door encounters an obstacle, the Balance state is entered. If the door overshoots the Back-Stop, the Back-Stop state is entered.

In the First Opening State (Open1St), the door may already be opening (in case of a Push-and-Go trigger) or may be still closing (frown a previous cycle). The velocity reference is started at the current shuttle velocity. However, if the door is closing, the velocity reference is started at zero, and if the door is faster than the maximum A.N.S.I. speed, it is started from the maximum.

The shuttle velocity is accelerated until it is such that if the door continued opening at the corresponding angular velocity, it would open in the desired time. The angular speed is then defined as the Plateau speed and programming exits to the next state. If the door encounters an obstacle, the Balance state is entered.

In the Second Opening State (Open2St) the door is opened at the Plateau speed and, when the door reaches Back-Check, the next state is entered. If the door encounters an obstacle, the Balance state is entered (at B, FIG. 18), and if the door overshoots the Back-Stop, the Back-Stop state is entered (at S, FIG. 17).

In the Third Opening State (Open3St) the door is decelerated to the Crawl speed. When the door reaches the Crawl speed (or if the plateau speed is already less than the Crawl speed), the next state is entered. As before, if the door encounters an obstacle the Balance state is entered, and if the door overshoots the Back-Stop the Back-Stop state is entered.

The Fourth Opening State (Open4St) opens the door at the same speed. If the door overshoots the Back-Stop, programming enters the Back-Stop state. If this state times out (after eight seconds) because of a strong Back-Check force, the next state is entered. If the door encounters an obstacle, programming exits to the Balance state.

In the Back-Stop State (BckStpSt) the door is moved towards the Back-Stop, as defined by the "Angle" adjustment and with a speed proportional to its distance to the Back-Stop, and held it there. The close delay time from the "Delay" adjustment is set and the timer is advanced. If the swing area is busy or the Must-Open conditions are met, the timer is restarted. If the timer reaches the close delay time, programming exits to the First Close State (at C, FIG. 19).

Figure 18:
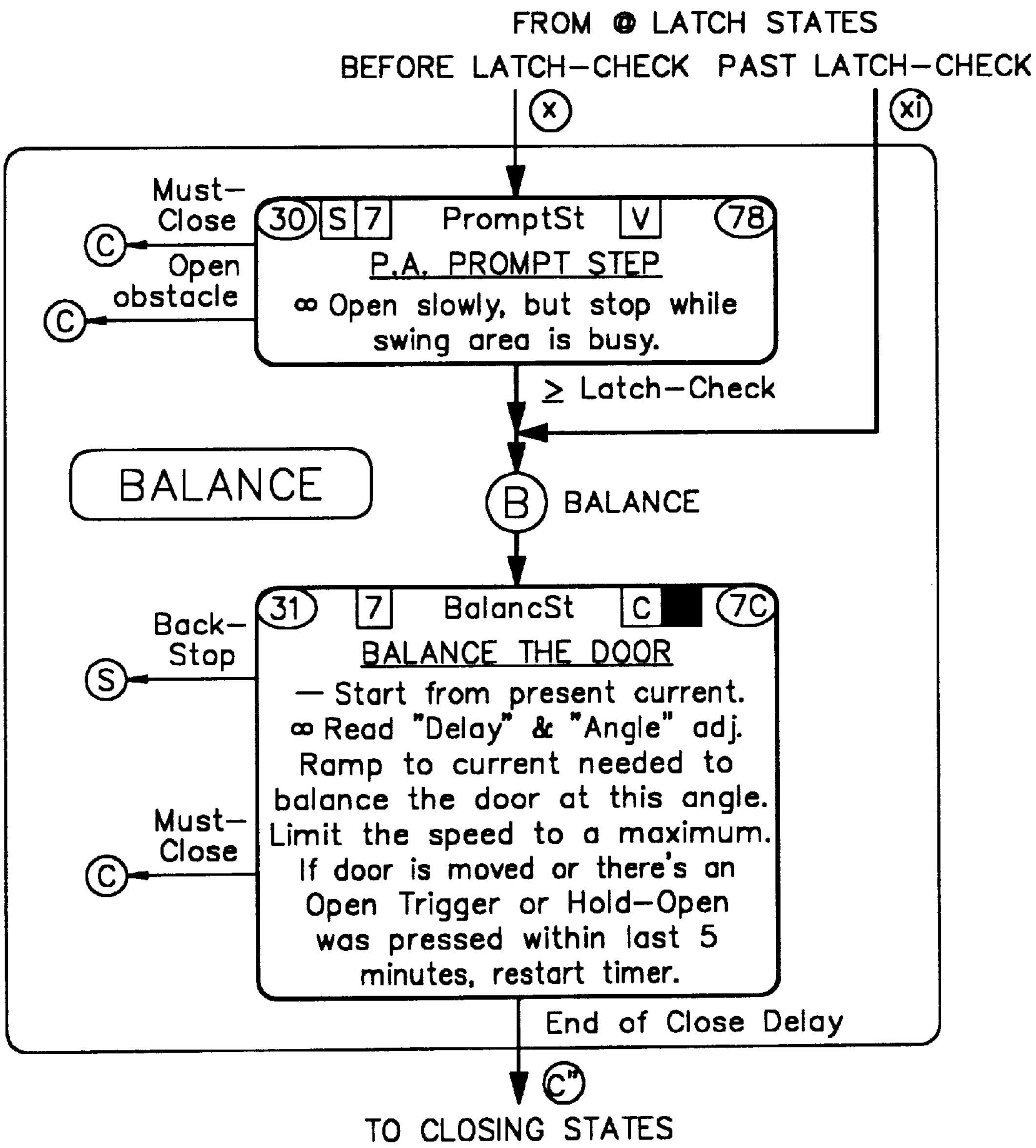

In the Balance group of States (termed Assist states in the previous embodiment) illustrated in FIG. 18, controller 113 assists a user by balancing the force required to open the door. These states are typically used for a power-assist mode configured controller (at switches 133). If the door encounters an obstacle, the program enters these States, even if controller 113 is configured for low-energy, automatic opener mode operations. If the door is at the Latch-Stop it steps forward to Latch-Check to prompt the user. The controller then generates enough torque to overcome most of the torque due to the return springs, enough that the door will not be moved by their force alone. This allows the user to open the door with a reduced force. For a power-assist operator, the program sets the force that the user must use from the "Open" adjustment. For a low-energy door, the program sets a default force, since, in this case, the "Open" adjustment has a different function. The program sets the close delay time from the "Delay" adjustment. The program advances a timer. If the Must-Open conditions are met, or the door is moved, the program restarts the timer. If the timer reaches the close delay time, controller 113 closes the door.

If the user presses the "Hold-Open" switch the Must-Open conditions are true for five minutes. Therefore controller 113 stays in the balance state for five minutes, plus the Close Delay time. If the user pushes the "Close" switch, or if the motor temperature is too high, the Must-Close conditions are met, and apparatus 15 closes the door.

This group includes two program states. In a normally triggered, power-assist cycle, the program enters this group at the Prompt State. In case of obstacle or if a power-assist operator is retriggered, or for a Push-and-Go trigger, the program enters these states directly at the Balance State. In all these states, if the Must-Close conditions are met, the program exits to the First Close state (at C, FIG. 19).

In the Prompt State (PromptSt) the door is opened slightly to prompt the user. When the door reaches Latch-Check programming exits to the next State, or, if there is an opening obstacle, exits to the First Close State.

The Balance State (BalancSt) assists the user by balancing the spring forces. The close delay time is set from the "Delayl" adjustment and a timer is advanced. If the Must-Open conditions are met, or the door is moved, the timer is restarted. If the timer reaches the Close Delay time, programming exits to the First Close State. If the user moves the door past the Back-Stop, the Back-Stop State is entered (at S, FIG. 17).

Figure 19:
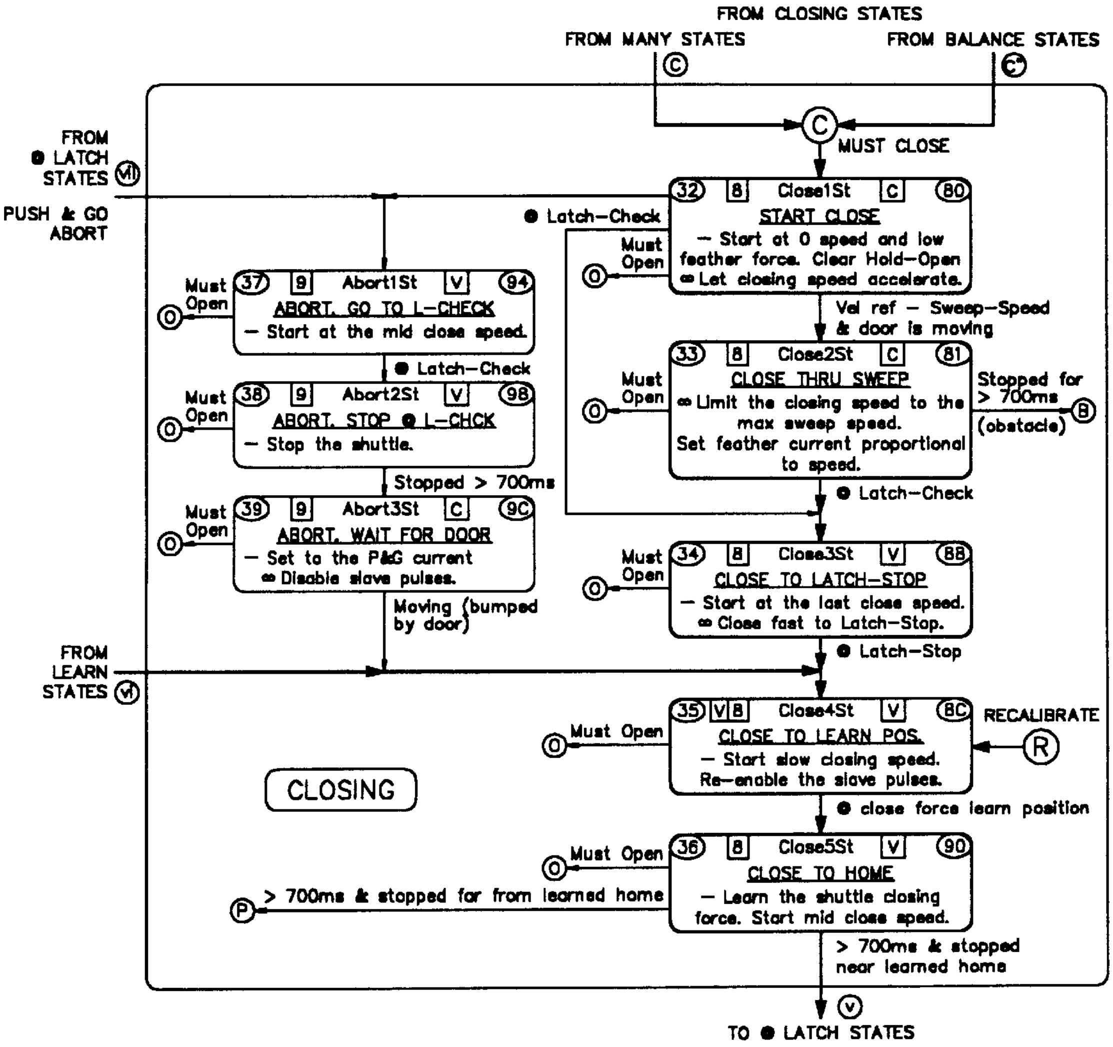

In FIG. 19, the Closing group of states is illustrated. Here the program controls the door's closing to the Latch-Check position, limiting its speed to a profile within the maximums allowed by A.N.S.I., and then lets the door close to Latch-Stop. The shuttle lets itself be pushed (or urged) by the piston to the closed position, while limiting the piston's speed to the closing profile. The apparatus behaves as a Current type servo to ensure that the shuttle remains in contact (the "feather force") with the piston even if the piston stops by controlling motor current.

The value of the feather force is critical. A high feather force allows the shuttle to remain in contact with the piston, but also adds a drag that can slow down a closing door significantly. A low feather Force allows the door to close without being slowed down, but the shuttle may separate from the piston if the door is stopped by an obstacle. The program varies the feather force dynamically. At lower shuttle speeds, the feather force is reduced, allowing the door to close slowly without stopping. At higher shuttle speeds, the force is increased, giving enough braking force to slow the shuttle if the door suddenly slows down. The feather force is also adjusted to reflect system variables such as door position and learned friction in the system.

It is normal during closing for the shuttle to separate temporarily from the piston. In that case, the shuttle stops, waiting for the piston to catch-up. If this doesn't happen within a short time (700 ms), controller 113 assumes that the door encountered an obstacle, and controller 113 begins balancing the door. When the shuttle reaches Latch-Check, the program switches to velocity control and the controller quickly brings the shuttle to Latch-Stop, leaving the door free to close under control of mechanism 31.

The controller then generates a Slave trigger output, unless the opening cycle was started by another operator through a Slave trigger. It also reenables the generation of slave pulses, which might have been disabled if a cycle had been started by a Slave trigger. The program moves the shuttle in a closing (or receding) direction (i.e., Home) very slowly and learns the force required to close the shuttle. This force is different from the shuttle opening force, and depends upon dynamic friction, which changes among units, and over time and temperature.

Finally, controller 113 brings the shuttle home. When the shuttle stops at home, if its position is very far from the learned Home position, the program assumes that it lost the shuttle registration, and it restarts from scratch. If a Push-and-Go trigger was aborted, the controller brings the shuttle to the Latch-Check position, and waits for the door to close. Then, it completes the closing cycle. Similarly, when starting to close, if controller 113 determines that the door is stopped by a hard stop, it brings the shuttle to the Latch-Check position and then waits there for the door to close before it completes the closing cycle. To ensure that the learned shuttle forces are still valid, after an hour of inactivity, the program recalibrates them.

This group includes eight program states. In a normal closing cycle, the program enters this group in the First Close State. In the case of an aborted Push-and-Go trigger, the program enters this group in the First Abort State. At the end of the learn states, and for recalibration, the program enters these states at the Fourth Close state (at R). In all these states, if the Must-Open conditions are met, programming continues at point O in FIG. 16.

In the First Close State (Clos1St) the door begins closing, the door velocity being allowed to accelerate to the sweep speed. The shuttle is pressed against the piston with the feather force, or higher if required to limit its speed to the reference velocity. After the door reaches the sweep speed, the next state is entered. If, after a selected time, the door doesn't move, programming assumes that it is held by a door stop and exits to the First Abort state. If the door reaches Latch-Check, the Third Close State is entered.

The Second Close State (Clos2St) allows the door to close through the sweep. The shuttle presses against the piston with the feather force, or higher if required to limit its speed to the sweep speed. When it reaches the Latch-Check, the next State is entered. If the shuttle stops for a short time, for example about 700 ms, it is assumed that the door encountered an obstacle and the Balance State is entered (at B, FIG. 18).

In the Third Close State (Clos3St) the door closes to Latch-Stop. The shuttle is brought out of contact with the piston allowing the door to close under control of mechanism 31 to the Latch-Stop whereupon the next State is entered.

The fourth Close State (Clos4St) allows the shuttle to move to a position between Latch stop and Home where the shuttle is driven by the motor (against spring 91) sufficiently for the controller to learn the force required to move the shuttle in the closing direction. If enabled, a slave pulse is generated and time slave pulses are reenabled for the next cycle. When the shuttle reaches the close force learn position, the Fifth Close State (Clos5St) is entered.

In the Fifth close state, the shuttle closing force is learned and closing is continued at a mid closing speed. When the shuttle stops for more than a short time, for example about 700 ms, it is assumed that the shuttle is Home. The shuttle position registration is then checked and, if it is within a certain range, the 1st Latch State is entered. If not, the program is restarted from scratch.

The First Abort State (Abort1St) is entered if the Push-and-Go trigger was aborted or the door is held open by a door stop. The shuttle to brought to Latch-Check and the next State is entered. The Second Abort State (Abort2St) stops the shuttle for a short time, for example about 700 ms and then goes on to the next State.

In the Third Abort State (Abort3St) the door is awaited, just enough force being used to overcome the shuttle spring. When the shuttle starts moving in the closing direction, it is assumed that the door has been closed, and the next state is entered.

As may be appreciated, this controller programming accommodates operation under atypical conditions. A normal cycle may be interrupted by a trigger by an obstacle, by personnel, or by other external causes. For example, if personnel keep the door open with a door stop, controller 113 sees that the door doesn't close when allowed to do so. Controller 113 retracts the shuttle to the Latch-Check position, and waits for the door. After personnel remove the door stop, the door closes to Latch-Check, the piston bumps the shuttle, controller 113 sees the shuttle move, and continues the closing cycle normally.

If, while controller 112 is opening or balancing the door, the Must-Close conditions are met (the user pressed the Close switch or the motor is overheating), controller 113 closes the door. If, while controller 113 is closing the door, the Must-Open conditions, are met (an open or Slave trigger, or personnel press the Hold-Open switch), a low-energy configured operator reopens the door, and a power-assist operator balances it.

If the Push-and-Go feature is enabled, and an abled user opens the door, controller 111 aborts the cycle. If the door meets an obstacle during a low-energy opening or during closing, controller 111 balances the door. If the motor overheats, controller 113 closes the door, waits five minutes, and then restarts from scratch.

When the shuttle stops at its home, controller 113 compares that position with the stored home position. If the two differ significantly, controller 113 assumes a registration error occurred, and restarts the program from scratch (i.e., if the shuttle stops far from the learned home position, controller 113 relearns the home position).

If a power failure occurs while the door is opened by apparatus 15, the return spring closes the door. As the door closes, the motor becomes a generator and powers the controller module. Controller 113 believes that the power was restored, and begins operating. Whether controller 113 was started by a true power-up or by a door closing and turning the motor, it behaves the same: if the door is closing, it limits its speed, until the shuttle stops.

In the field, the apparatus of this invention would normally be shipped from the factory with configuration (DIP or sliding, for example) switches 133 preconfigured for a push or pull side mounting, fully automatic or power assist mode of operation, and external trigger (push plate or the like) and/or push and go operation where, when the moving vertical edge of the door is moved in the opening direction about one inch, the power open or power assist function is automatically activated.

A push side mounting uses a 2 link connecting arm between mechanism 31 and the door. The pull side mounting uses a single connecting arm and a slide track which is mounted along and parallel to the top edge of the door. A door which opens away from the user and has the hinge on the right side is a right hand door. A door which opens away from the pedestrian and has the hinge on the left side is a left hand door.

Any of the above factory settings can be changed in the field with little difficulty by resetting switches 133. Manual closing force can be adjusted with a simple screw type adjustment.

Once the apparatus of this invention has been physically secured in place and connected with either the existing mechanism 31 or, in the case of an integrated unit, connected with either the two link arms or the slide track (depending on whether a push or pull mounting) to the door, the installer sets the adjustments of the manual door closing mechanism 31 as is well known by those skilled in the field.

These adjustments normally determine the parameters of motion of the door during manual opening end the closing portion of its cycle, and include the closing force adjustment, set within the approximate range of 5 lb. to 11 lb., sweep speed adjustment at the sweep valve to set the closing speed between the fully open position and approximately 10 open, latch speed adjustment at the latch valve to set the closing speed between 10° open and fully closed, and backcheck adjustment at the backcheck to set the opening resistance at about 65° of door opening (a hydraulic damping force whose magnitude increases with increasing door velocity, typically between about 0 and 30 lb. under normal operating conditions).

Referring to FIGS. 2, 8A and 9A through 9C, the installer then makes four adjustments which control the behavior of the door during the fully automatic or power assisted opening portion of the door motion depending upon factory or field set configuration).

If controller 113 is configured in the fully automatic power opening mode, adjustment switch 160 is used to set the amount of tire that the door delays in the fully open position before it begins closing. The range of adjustment is typically between about 5 seconds to 60 seconds. Adjustment switch 156 is used to set the time to open from fully closed to about 65° of opening. An opening time range is established by this setting, with the difference between minimum opening time and maximum opening time being, for example, about 10 seconds. The upper and lower limits of opening time are, however, dependent upon door size setting.

Adjustment switch 158 is used to set the angle to which the door opens when opened under power (i.e., establishing the back stop). The range is about 85° to about 115°, but the exact limits of the opening adjustment depend upon the particular installation. For example, the reveal, or distance, between the face of the door nearest apparatus 15 and the vertical surface to which apparatus 15 is mounted, will affect the range of door opening angles. Rotating the switch in one direction immediately increases the opening angle, while rotating the switch in the opposite direction immediately decreases the opening angle. Adjustment switch 162 is used to set the door size. It may be provided with three positions which correspond to small, medium end large doors, or may be a continuously variable control.

If controller 113 is configured for operation in the power assist mode, adjustment switch 160 is used as before to set the amount of time that the door holds the final position to which it was pushed open before it begins closing. Adjustment switch 156 is used to set the amount of force that is required by the user to open the door from approximately fully closed to any open position up to about 115° of opening. The opening force range is between about 0.5 lb. to about 5.0 lb, irrespective of the size of the door, door position or the closing force set by the installer. Adjustment switches 158 and 162 are used as previously described.

Once these adjustments are made, the installer installs any external devices which may be desired, such as a push plate or open switch, safety mat, presence sensor, motion detector, RF link or the like, and makes any systems connections which may be desired (for example, connection with the fire alarms of the facility, or the like). Power supply is established through any standard receptacle.

Power switch 164 turns the power to the unit on or off. Mode switch 154 may be toggled as desired for door hold open or immediate door close, while power assist or fully automatic opening (depending on controller 113 configuration) operations are maintained in the switch central position. Switch 154 rocks to either side. Rocking the switch in one direction causes the door to be continuously held open. Rocking the switch in the opposite direction triggers the controller to close the door and prevents further powered reopening as long as the switch is held in this position. Alternative switch arrangements could of course be utilized.

In the normal, or manual, mode of operation the user simply opens the door as usual by manually pushing or pulling on it. The opening is resisted by the spring force of mechanism 31. Door closing is accomplished and controlled by mechanism 31 which uses hydraulic damping and spring force to smoothly close the door and then provide a continuous bias force to hold the door closed.

If the user enables powered operation of the door by depressing a push plate, or the like as above described, the door will either open automatically (fully automatic mode), or will open slightly and wait for the user to push it open with reduced force requirement (power assist mode). If controller switches 133 are configured for enablement of the push and go feature, then every time the door is pushed open slightly from the closed position it will either open automatically under power or it will provide power opening assistance depending on controller configuration.

As may be appreciated a versatile door operator and operating method is provided by this invention which is appropriate for use in entranceways accessible to persons of a variety of abilities.

What is claimed is:

1. A method for learning, storing and controlling operational parameters of a door in conjunction with electromechanically influenced operation of an independently operable mechanism connectable with the door and including a piston for controlling door closing characteristics by selected fluid flow within the mechanism, said method comprising the steps of:

learning operational variables of a particular door installation without user intervention; or activation and storing said learned operational variables in memory.

2. The method of claim 1 further comprising updating said learned operational variables during operation of the door.

3. The method of claim 2 wherein the steps of learning and updating operational variable includes learning and updating friction inherent in operation of the door.

4. The method of claim 1 wherein at least one of said unit and the mechanism includes a return spring, the step of learning operational variables including learning preload of said spring.

5. The method of claim 1 wherein the step of learning operational variables includes learning the position of said piston when the door is closed.

6. The method of claim 1 wherein the step of learning operational variables includes repeating a learn cycle until selected operational variables learned during a cycle match selected stored operational variables learned in a previous cycle.

7. The method of claim 6 further comprising initiating a potential mechanical difficulty indication when no said match is found within a preselected number of learn cycles.

8. The method of claim 1 wherein the step of continuously learning operational variables of a particular door installation is done by causing a unit to contact and move the piston and thus the door.

* * * * *